US011520438B2

(12) United States Patent
Drumm

(10) Patent No.: US 11,520,438 B2
(45) Date of Patent: Dec. 6, 2022

(54) THIN COUPLERS AND REFLECTORS FOR SENSING WAVEGUIDES

(71) Applicant: Beechrock Limited, Castletown (IM)

(72) Inventor: Owen Drumm, Dublin (IE)

(73) Assignee: Beechrock Limited, Castletown (IM)

( * ) Notice: Subject to any disclaimer, the term of this patent is extended or adjusted under 35 U.S.C. 154(b) by 0 days.

(21) Appl. No.: 17/130,389

(22) Filed: Dec. 22, 2020

(65) Prior Publication Data
US 2021/0109625 A1 Apr. 15, 2021

Related U.S. Application Data

(63) Continuation of application No. 16/156,817, filed on Oct. 10, 2018, now Pat. No. 10,901,555.

(60) Provisional application No. 62/570,558, filed on Oct. 10, 2017.

(51) Int. Cl.
*G06F 3/042* (2006.01)
*G02B 6/42* (2006.01)
*G02B 6/43* (2006.01)

(52) U.S. Cl.
CPC .......... *G06F 3/0421* (2013.01); *G02B 6/42* (2013.01); *G02B 6/4214* (2013.01); *G02B 6/43* (2013.01); *G06F 3/0428* (2013.01); *G06F 2203/04109* (2013.01)

(58) Field of Classification Search
CPC .......... G06F 3/0421; G06F 3/0428; G06F 2203/04109; G02B 6/4214; G02B 6/42; G02B 6/43
See application file for complete search history.

(56) References Cited

U.S. PATENT DOCUMENTS

| 10,401,546 B2 | 9/2019 | Craven-Bartle et al. |
| 2007/0075444 A1 | 4/2007 | Zheng et al. |
| 2007/0201042 A1* | 8/2007 | Eliasson ............... G06F 3/0386 356/614 |
| 2008/0278460 A1* | 11/2008 | Arnett ................... G06F 3/0428 362/555 |

(Continued)

FOREIGN PATENT DOCUMENTS

| JP | 2016-530617 A | 9/2016 |
| KR | 10-2015-0032749 A | 3/2015 |

(Continued)

OTHER PUBLICATIONS

PCT International Search Report and Written Opinion, PCT Application No. PCT/IB2020/000361, dated Sep. 10, 2020, 13 pages.

(Continued)

*Primary Examiner* — Liliana Cerullo
(74) *Attorney, Agent, or Firm* — Fenwick & West LLP

(57) ABSTRACT

An optical touch-sensitive device is able to determine the locations of multiple simultaneous touch events. The optical touch-sensitive device can include an optical waveguide, an emitter, and an emitter coupler. The emitter produces optical beams, and the emitter coupler is on a surface of the waveguide and is configured to direct at least some of the optical beams to propagate via total internal reflection (TIR) through the waveguide as coupled optical beams. Touches on the top surface of the waveguide disturb the coupled optical beams, and the touch-sensitive device determines touch events based on the disturbances.

20 Claims, 22 Drawing Sheets

(56) References Cited

U.S. PATENT DOCUMENTS

| | | |
|---|---|---|
| 2010/0110005 A1* | 5/2010 | Chtchetinine ......... G06F 3/0421 |
| | | 345/158 |
| 2012/0212458 A1 | 8/2012 | Drumm |
| 2012/0230050 A1 | 9/2012 | Kim et al. |
| 2014/0253831 A1* | 9/2014 | Craven-Bartle ..... G02B 6/0018 |
| | | 349/12 |
| 2016/0069756 A1 | 3/2016 | Kim et al. |
| 2016/0170562 A1 | 6/2016 | Ilmonen et al. |
| 2016/0334942 A1 | 11/2016 | Wassvik |
| 2017/0109561 A1 | 4/2017 | Wyrwas et al. |
| 2017/0255813 A1 | 9/2017 | Chen et al. |
| 2018/0267672 A1* | 9/2018 | Wassvik ................ G06F 3/0428 |
| 2019/0107923 A1 | 4/2019 | Drumm |
| 2022/0035161 A1 | 2/2022 | Sinay et al. |

FOREIGN PATENT DOCUMENTS

| | | |
|---|---|---|
| KR | 10-2017-0103755 A | 9/2017 |
| WO | WO 2016/111707 A1 | 7/2016 |

OTHER PUBLICATIONS

Taiwan Intellectual Property Office, Office Action, Taiwanese Application No. 107135866, dated Oct. 22, 2019, 15 pages.
United States Office Action, U.S. Appl. No. 16/865,333, dated May 11, 2022, 11 pages.
Korean Intellectual Property Office, Office Action, Korean Patent Application No. 10-2020-7013174, dated Jul. 21, 2022, five pages, (with concise explanation of relevance).
Japan Patent Office, Office Action, JP Patent Application No. 2020-520782, dated Oct. 18, 2022, 18 pages.

* cited by examiner

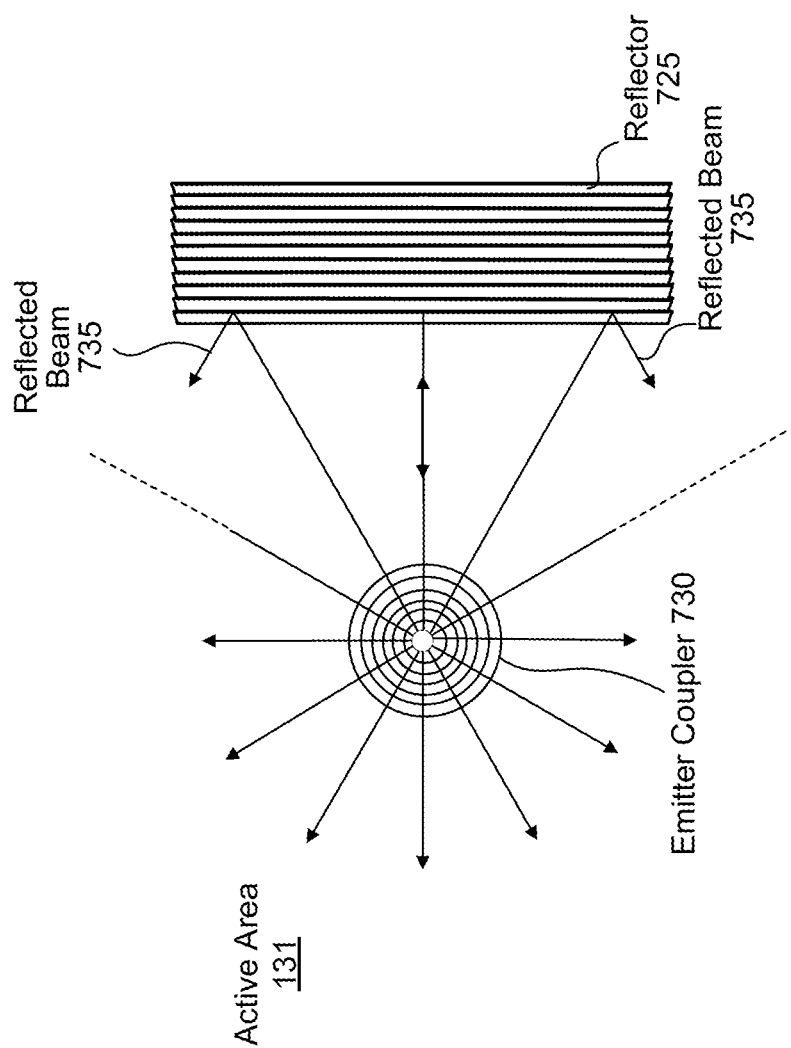

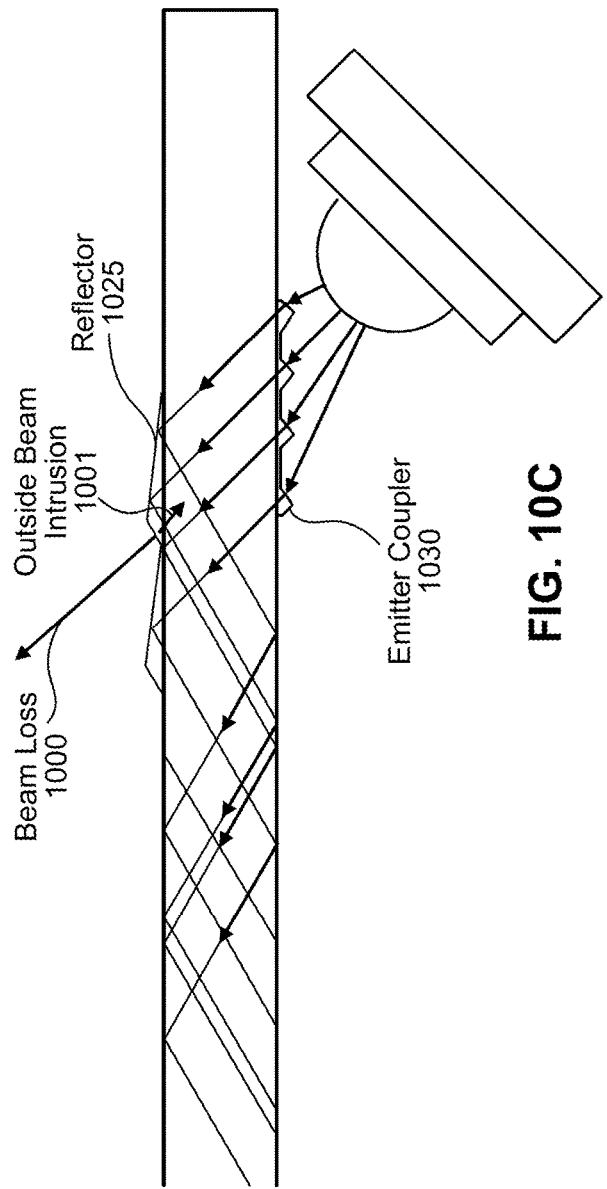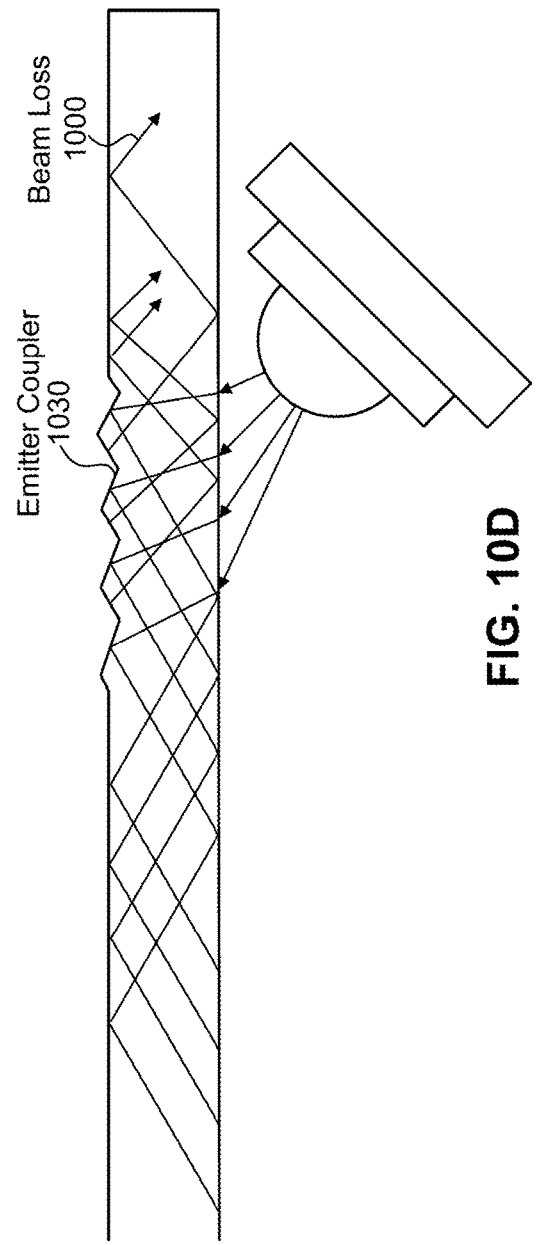

THIN COUPLERS AND REFLECTORS FOR SENSING WAVEGUIDES

CROSS-REFERENCE TO RELATED APPLICATIONS

This application is a continuation of U.S. Non-Provisional application Ser. No. 16/156,817, titled "Thin Couplers and Reflectors for Sensing Waveguides," filed on Oct. 10, 2018, which claims priority to U.S. Provisional Patent Application No. 62/570,558, filed on Oct. 10, 2017, the subject matter of which is incorporated by reference herein in its entirety.

BACKGROUND

1. Field of Art

The present disclosure relates to optical couplers, and specifically, to optical couplers in touch-sensitive devices.

2. Description of the Related Art

Touch-sensitive devices (e.g., touch-sensitive displays) for interacting with computing devices are becoming more common. A number of different technologies exist for implementing touch-sensitive devices. Examples of these techniques include, for example, resistive touch screens, surface acoustic wave touch screens, capacitive touch screens, and certain types of optical touch screens.

However, many of these approaches currently suffer from drawbacks. For example, some technologies may function well for small sized displays, as used in many modern mobile phones, but do not scale well to larger screen sizes as in displays used with laptop computers, desktop computers, interactive whiteboards, etc. For technologies that require a specially processed surface or the use of special elements in the surface, increasing the screen size by a linear factor of N means that the special processing must be scaled to handle the $N^2$ larger area of the screen or that $N^2$ times as many special elements are required. This can result in unacceptably low yields or prohibitively high costs.

Another drawback for some technologies is their inability or difficulty in handling multitouch events. A multitouch event occurs when multiple touch events occur simultaneously. This can introduce ambiguities in the raw detected signals, which then must be resolved. If such ambiguities are not resolved in a speedy and computationally efficient manner it may make implementation of the technology impractical or unviable. If too slow, then the technology will not be able to deliver the touch sampling rate desired for the system. If too computationally intensive, then this will drive up the cost and power consumption of the technology.

One type of optical touchscreen involves coupling light from emitters into a waveguide, however existing techniques can represent a significant manufacturing cost. Thus, there is a need for improved touch-sensitive systems.

SUMMARY

Some embodiments relate to an optical touch-sensitive device with an optical waveguide, an emitter, and an emitter coupler. The optical waveguide extends over a surface of the device and has a top surface and a bottom surface. The emitter is optically coupled to the waveguide and configured to produce optical beams. The emitter coupler is on a surface of the waveguide and is configured to direct at least some of the optical beams to propagate via total internal reflection (TIR) through the waveguide as coupled optical beams. Touches on the top surface of the waveguide disturb the coupled optical beams, and the touch-sensitive device determines touch events based on the disturbances. In some embodiments, the optical touch-sensitive device includes a detector optically coupled to the waveguide and a detector coupler. The detector coupler is on a surface of the waveguide and is configured to redirect at least some of the coupled optical beams out of the waveguide towards the detector.

Some embodiments relate to an optical touch-sensitive device with an optical waveguide, one or more emitters, and an optical reflector. The optical waveguide has a surface, an opposing surface, and a side surface. The one or more emitters emit optical beams, the emitted optical beams propagate via total internal reflection (TIR) in the waveguide. Touches on the surface of the waveguide disturb the optical beams, and the touch-sensitive device determines touch events based on the disturbances. The optical beams propagate at elevation angles relative to the plane of the surface of the waveguide. The optical reflector is on a surface of the waveguide. The optical reflector reflects optical beams propagating in the waveguide, wherein incident optical beams propagate through the waveguide at an initial elevation angle and reflected optical beams propagate through the waveguide at a modified elevation angle. The optical reflector includes a plurality of reflective structures, a first one of the reflective structures comprising a first surface and a second surface. The first surface is oriented to reflect optical beams incident at the initial elevation angle at the modified elevation angle as reflected optical beams. The second surface is oriented to reflect a portion of the reflected optical beams at an intermediate elevation angle towards a second one of the reflecting structures. In some embodiments, the intermediate elevation angle is substantially equal to the negative of the initial elevation angle. In some embodiments, the beams propagating at the intermediate elevation angle towards the second reflecting structure redirect off of a first surface of the second reflecting structure at the modified elevation angle. Additionally or alternatively, planar reflectors may be used to redirect beams. In some embodiments, the modified elevation angle is substantially equal to the initial elevation angle.

Some embodiments relate to an optical touch-sensitive device with an optical waveguide, an emitter array, a detector array, an emitter coupler, a detector coupler, and one or more reflectors. The optical waveguide extends over a surface of the device, the waveguide having an active area and a periphery. The emitter array is coupled to the waveguide and is configured to produce concentrated optical beams. The detector array is coupled to the waveguide and is configured to receive concentrated optical beams. The emitter coupler is on the periphery of the waveguide. The emitter coupler includes optical structures configured to distribute the concentrated optical beams from the emitter array across the active area of the waveguide according to a predetermined pattern. Touches on the active area disturb the optical beams, and the touch-sensitive device determines touch events based on the disturbances. The detector coupler is on the periphery of the waveguide. The detector coupler includes optical structures configured to receive at least some optical beams and concentrate the received optical beams towards the detector array. The one or more reflectors are on the periphery. The reflectors include optical structures configured to reflect optical beams across the active area and towards the detector coupler.

BRIEF DESCRIPTION OF DRAWINGS

Embodiments of the present invention will now be described, by way of example, with reference to the accompanying drawings, in which:

FIG. 7C is a top view of the coupler and reflector of FIGS. 7A and 7B, according to an embodiment.

FIGS. 10A-10D illustrate various emitter coupler and reflector arrangements, according to some embodiments.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

I. Introduction

A. Device Overview

Figure 1:
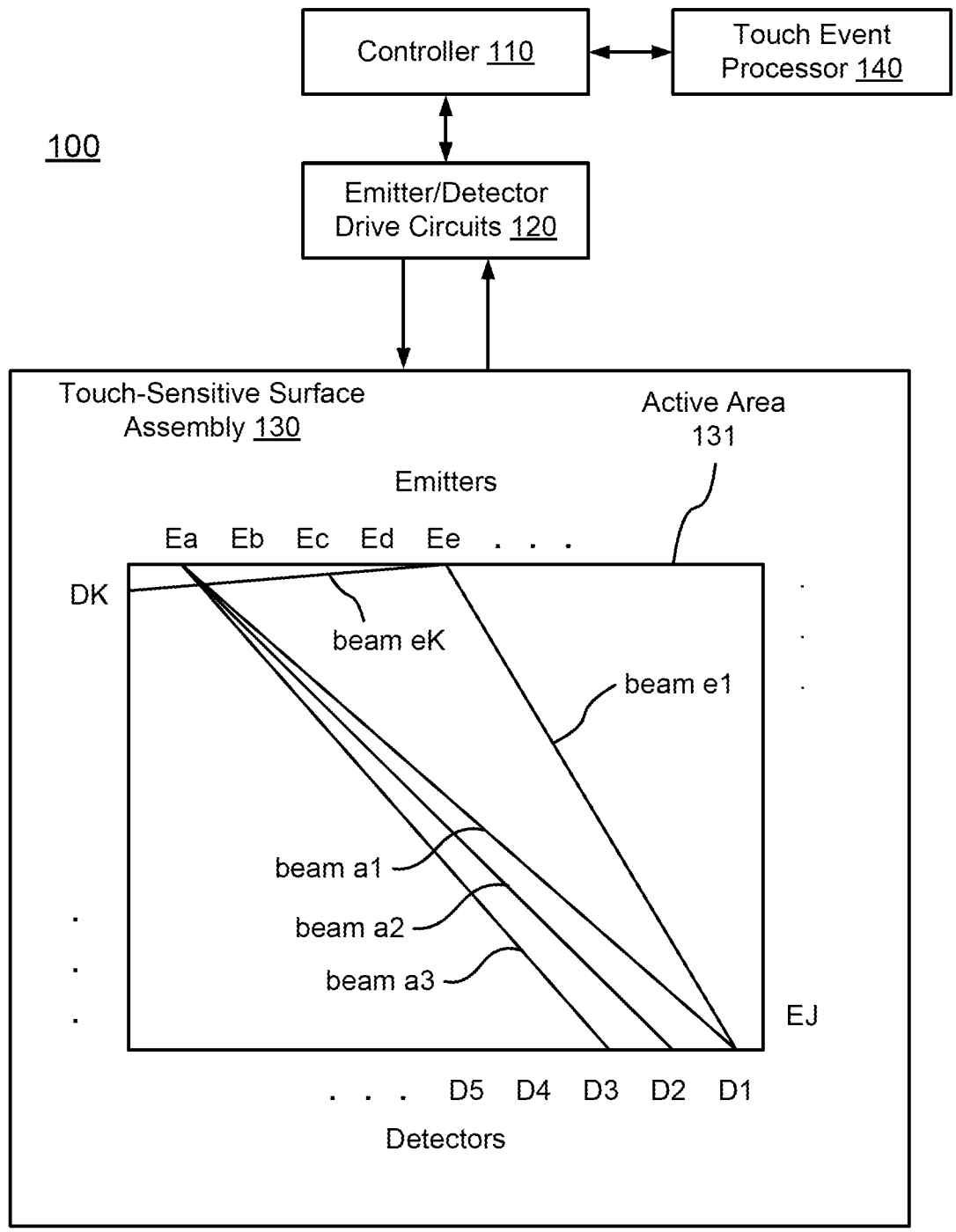
FIG. 1 is a diagram of an optical touch-sensitive device, according to an embodiment.

FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes an active area 131 over which touch events are to be detected. For convenience, the active area 131 may sometimes be referred to as the active surface or surface, as the active area itself may be an entirely passive structure such as an optical waveguide. The assembly 130 also includes emitters and detectors arranged along the periphery of the active area 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor. In other embodiments, emitters and detectors may be located around a portion of the periphery and reflectors can be used to obtain a desired distribution of beams over the surface.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1, and eK as examples. Touches within the active area 131 will disturb certain beams, thus changing what is received at the detectors Dk. Data about these changes is communicated to the touch event processor 140, which analyzes the data to determine the location(s) (and times) of touch events on surface 131.

B. Process Overview

Figure 2:
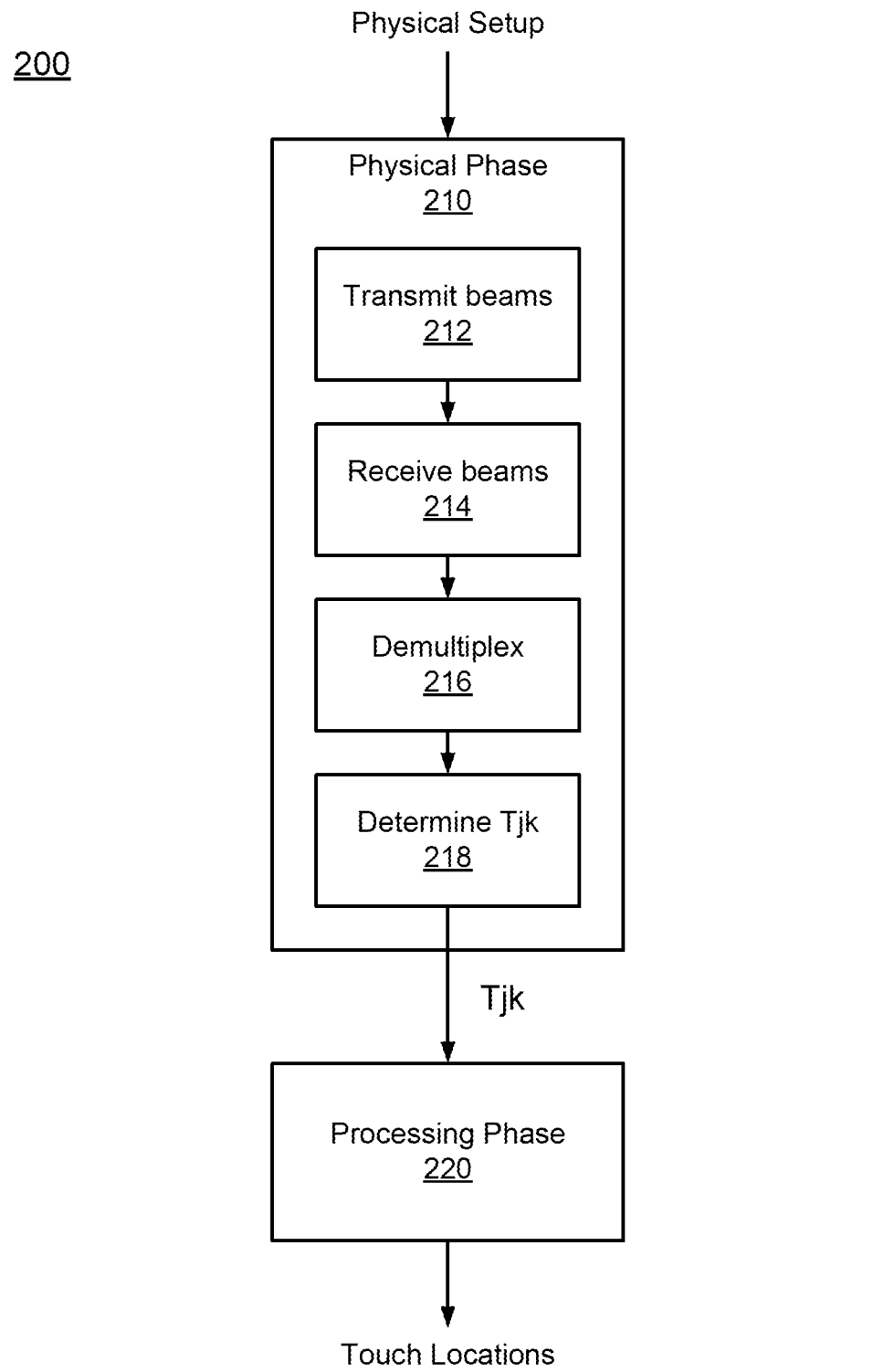
FIG. 2 is a flow diagram for determining the locations of touch events, according to an embodiment.

FIG. 2 is a flow diagram for determining the locations of touch events, according to one embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam.

The use of this specific measure is purely an example. Other measures can be used. In particular, since we are most interested in interrupted beams, an inverse measure such as (1−Tjk) may be used since it is normally zero. Other examples include measures of absorption, attenuation, reflection, or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 can also be implemented in many different ways. Candidate touch points, line imaging, location interpolation, touch event templates, and multi-pass approaches are all examples of techniques that may be used as part of the processing phase 220.

II. Physical Set-Up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

B. Touch Interactions

Figure 3A:
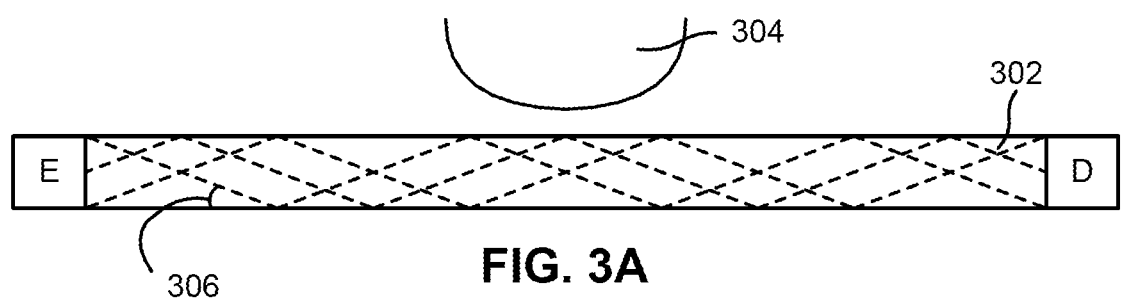
FIGS. 3A-3B illustrate a frustrated TIR mechanism for a touch interaction with an optical beam, according to an embodiment.
Figure 3B:
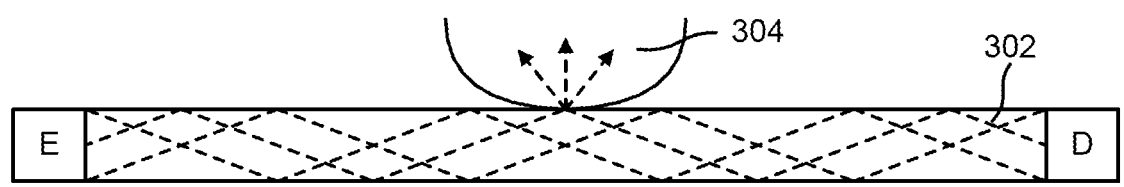

Different mechanisms for a touch interaction with an optical beam can be used. One example is frustrated total internal reflection (TIR). In frustrated TIR, an optical beam is confined to an optical waveguide by total internal reflection and the touch interaction disturbs the total internal reflection in some manner. FIGS. 3A-3B illustrate a frustrated TIR mechanism for a touch interaction with an optical beam.

The touch interactions can also be direct or indirect. In a direct interaction, the touching object 304 (e.g., a finger or stylus) is the object that interacts with the optical beam 302. For example, a finger may have a higher index of refraction than air, thus frustrating TIR when the finger comes into direct contact with a waveguide. In an indirect interaction, the touching object 304 interacts with an intermediate object, which interacts with the optical beam 302 (the optical beam 302 travels within the optical waveguide at elevation angle 306, as further described below). For example, the finger may cause a high index object to come into contact with the waveguide, or may cause a change in the index of refraction of the waveguide or surrounding materials.

Figure 3C:
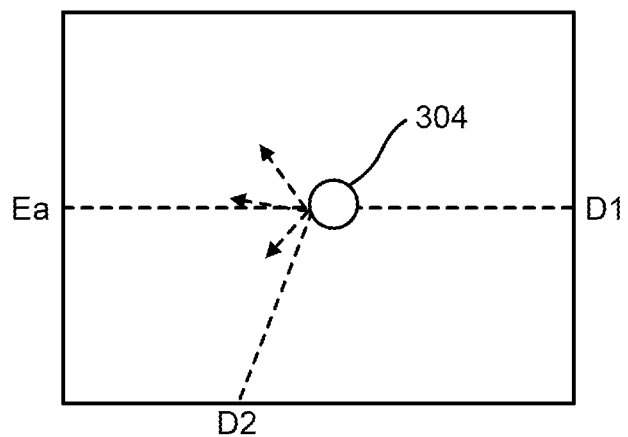
FIG. 3C illustrates a touch interaction with an optical beam enhancing transmission, according to an embodiment.

Note that some types of touch interactions can be used to measure contact pressure or touch velocity, in addition to the presence of touches. Also note that some touch mechanisms may enhance transmission, instead of or in addition to reducing transmission. FIG. 3C illustrates a touch interaction with an optical beam enhancing transmission. For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking.

C. Emitters, Detectors, and Couplers

Each emitter transmits light to a number of detectors. Usually, each emitter outputs light to more than one detector simultaneously. Similarly, each detector receives light from a number of different emitters. The optical beams may be visible, infrared, and/or ultraviolet (UV) light. The term "light" is meant to include all of these wavelengths and terms such as "optical" are to be interpreted accordingly.

Examples of the optical sources for the emitters include light-emitting diodes (LEDs), vertical-cavity surface-emitting lasers (VCSELs), and lasers. IR sources can also be used. Modulation of the optical beams can be external or internal. Examples of sensor elements for the detector include charge coupled devices, photodiodes, photoresistors, phototransistors, and nonlinear all-optical detectors.

The emitters and detectors may also include optics and/or electronics in addition to the main optical source or sensor element. For example, emitters and detectors may incorporate or be attached to lenses to spread and/or collimate emitted or incident light. Additionally, one or more optical coupling assemblies (couplers) of varying design can be used to couple the emitters and detectors to the waveguide.

D. Optical Beam Paths

Figure 4A:
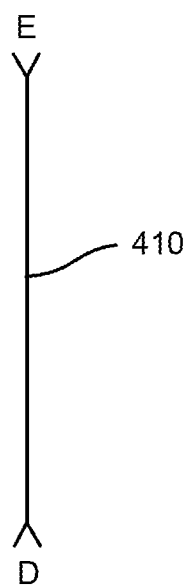
FIGS. 4A-4C are top views of differently shaped beam footprints, according to some embodiments.
Figure 4B:
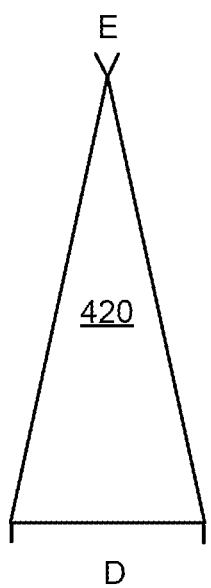
Figure 4C:
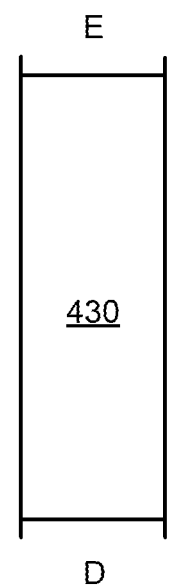

FIGS. 4A-4C are top or side views of differently shaped beam footprints. Another aspect of a touch-sensitive system is the shape and location of the optical beams and beam paths. In FIGS. 1-2, the optical beams are shown as lines. These lines should be interpreted as representative of the beams, but the beams themselves may be different shapes and footprints. A point emitter and point detector produce a narrow "pencil" beam 410 with a line-like footprint. A point emitter and wide detector (or vice versa) produces a fan-shaped beam 420 with a triangular footprint. A wide emitter and wide detector produces a "rectangular" beam 430 with a rectangular footprint of fairly constant width. Depending on the width of the footprint, the transmission coefficient Tjk behaves as a binary or as an analog quantity. It is binary if the transmission coefficient transitions fairly abruptly from one extreme value to the other extreme value as a touch point passes through the beam. For example, if the beam is very narrow, it will either be fully blocked or fully unblocked. If the beam is wide, it may be partially blocked as the touch point passes through the beam, leading to a more analog behavior.

Beams may have footprints in both the lateral (horizontal) direction, as well as in the vertical direction. The lateral footprint of a beam may be the same or different from the horizontal footprint of a beam.

The direction and spread of the light emitted from the emitters and received by the detectors may vary in spread or angle from beam footprints intended to cover the active area 131. To shape the beams to achieve the intended footprints, lenses, couplers, reflectors, or other optical structures may be attached to the emitters and detectors. For example, point emitters and detectors may be used in conjunction with lenses to spread beams in the horizontal or vertical directions.

Figure 5A:
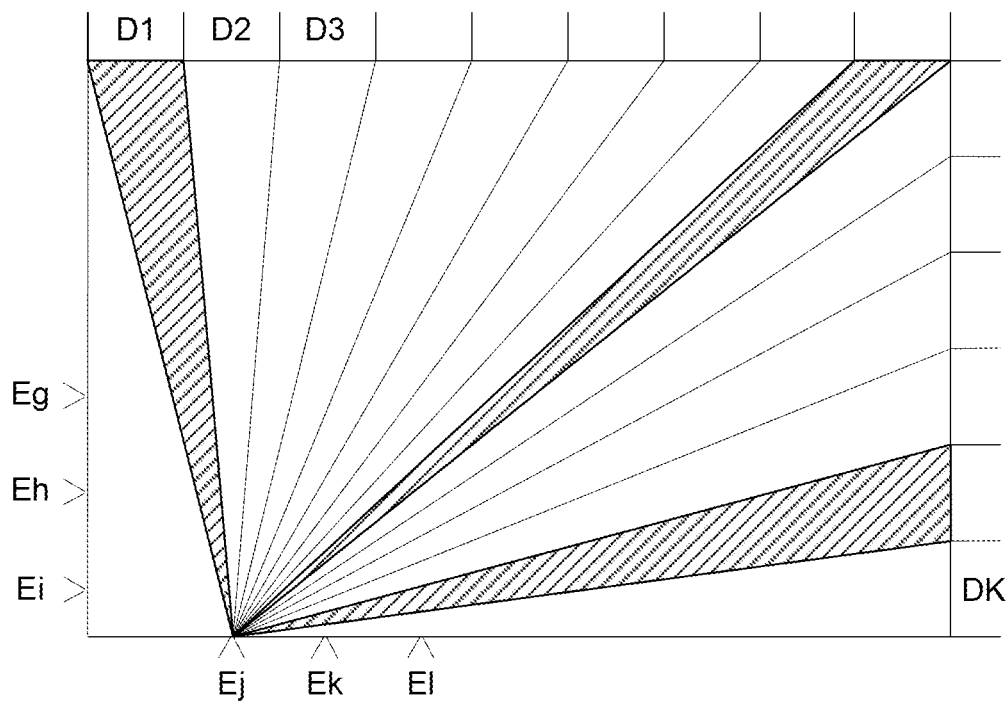
FIGS. 5A and 5B are top views illustrating active area coverage by emitters and detectors, according to some embodiments.
Figure 5B:
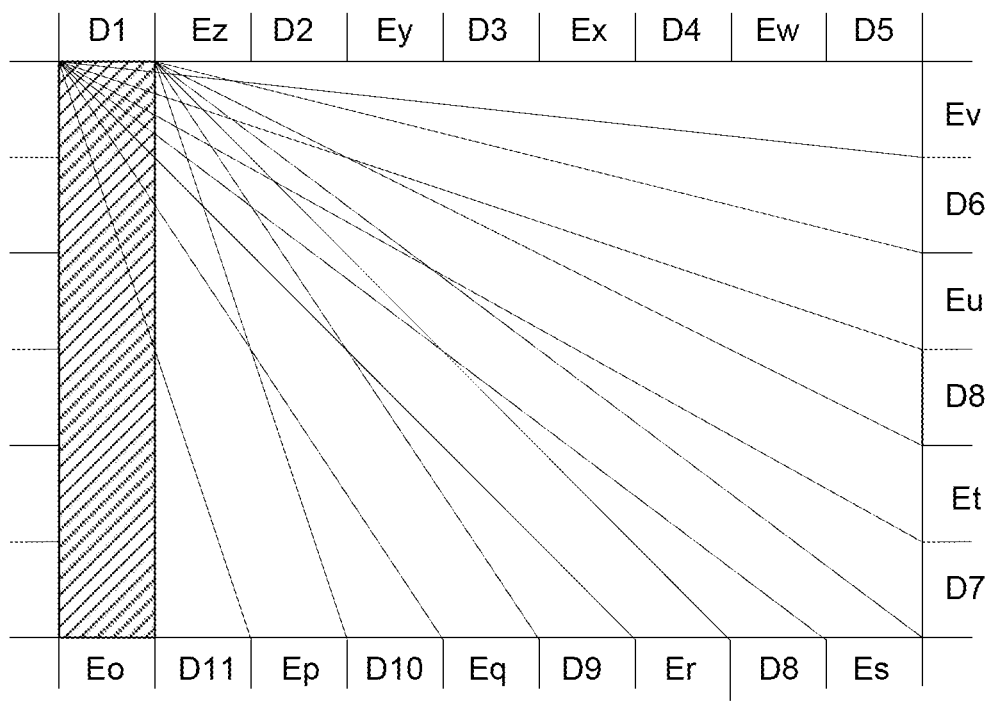

FIGS. 5A-5B are top views illustrating active area 131 coverage by emitters and detectors. As above, the emitters and detectors are arranged along the periphery of the active area 131. All the emitters may be arranged on two sides of the active area, for example two adjacent perpendicular sides as illustrated in FIG. 5A. Similarly, all of detectors may be arranged on the other two sides of the active area. Alternatively, the emitters and detectors may be mixed or interleaved according to a pattern as illustrated in FIG. 5B. This pattern may be one emitter in between each detector, or another more complicated arrangement.

In most implementations, each emitter and each detector will support multiple beam paths, although there may not be a beam from each emitter to every detector. The aggregate of the footprints from all beams from one emitter will be referred to as that emitter's coverage area. The coverage areas for all emitters can be aggregated to obtain the overall coverage for the system.

The footprints of individual beams can be described using different quantities: spatial extent (i.e., width), angular extent (i.e., radiant angle for emitters, acceptance angle for detectors), and footprint shape. An individual beam path from one emitter to one detector can be described by the emitter's width, the detector's width and/or the angles and shape defining the beam path between the two. An emitter's coverage area can be described by the emitter's width, the aggregate width of the relevant detectors and/or the angles and shape defining the aggregate of the beam paths from the emitter. Note that the individual footprints may overlap. The ratio of (the sum of an emitter's footprints)/(emitter's cover area) is one measure of the amount of overlap.

The emitters can provide a desired coverage of the active area 131. However, not all points within the active area 131 will be covered equally. Some points may be traversed by many beam paths while other points traversed by far fewer. The distribution of beam paths over the active area 131 may be characterized by calculating how many beam paths traverse different (x,y) points within the active area. The orientation of beam paths is another aspect of the distribution. An (x,y) point that is derived from three beam paths that are all running roughly in the same direction usually will be a weaker distribution than a point that is traversed by three beam paths that all run at sixty degree angles to each other.

The concepts described above for emitters also apply to detectors. A detector's coverage area is the aggregate of all footprints for beams received by the detector.

If the emitters and/or detectors are equally spaced along the sides of the active area 131, there may be large numbers of redundant beam paths. Thus, the emitters and/or detectors may not be evenly spaced apart. This may be referred to as dithering. Dithering can reduce the total number of emitters and detectors while ensuring a desired coverage of the active area 131.

Instead of arranging emitters and detectors along the entire periphery of the active area 131, optical couplers and reflectors can allow the emitters and detectors to be reduced and condensed into one or more emitter and detector arrays. Among other advantages, emitter and detector arrays can decrease manufacturing cost and complexity. This is further described below.

III. Optical Couplers, Reflectors, and Related Hardware

A. General Description

As introduced above, the optical touch-sensitive device 100 includes an optical waveguide that is optically coupled to the emitters and detectors with one or more optical coupler assemblies (or couplers). The optical touch-sensitive device may also include one or more reflectors, printed circuit boards (PCBs), ambient light shields, IR transmissive layers, air gaps and associated ambient light absorbing surfaces, or display modules.

Figure 6A:
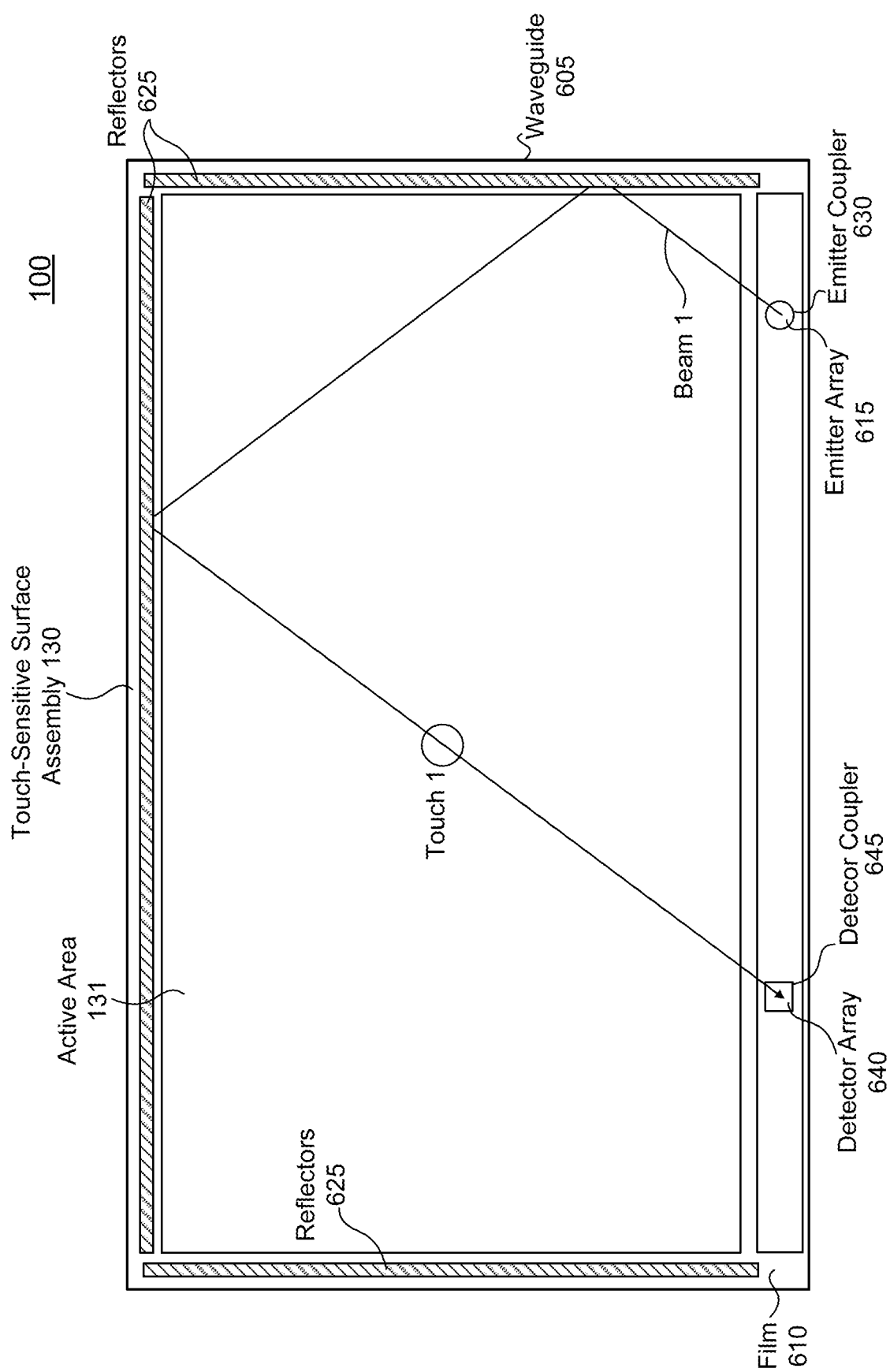
FIG. 6A is a top view of an optical touch-sensitive device with couplers and reflectors, according to an embodiment.
Figure 6B:
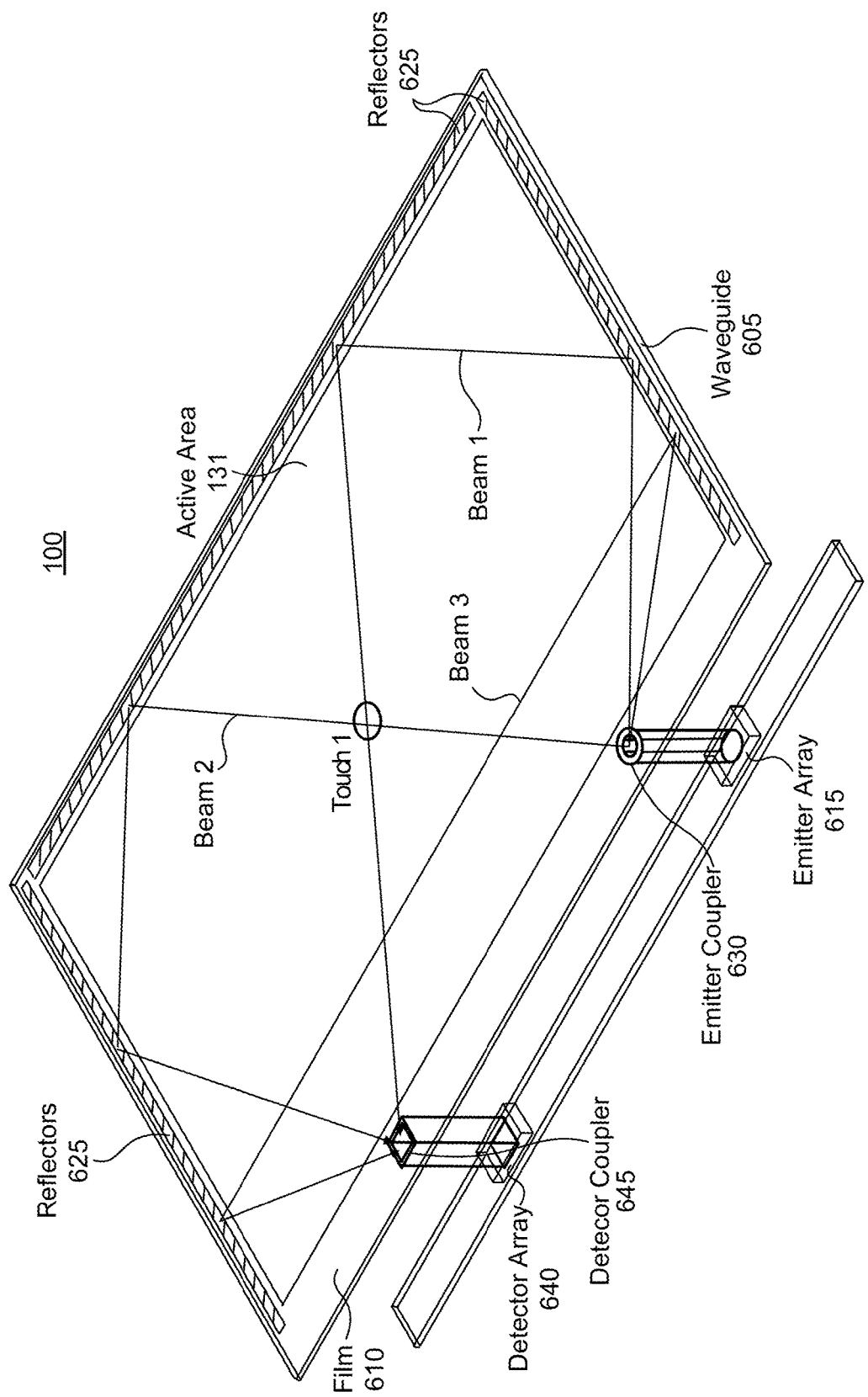
FIG. 6B is a perspective view of the optical-touch sensitive device with couplers and reflectors, according to an embodiment.

FIGS. 6A and 6B illustrate a touch-sensitive device 100 with an emitter array 615 and detector array 640, according to an embodiment. Touch events, detected using frustrated TIR, are received within the active area 131 of the top surface of the waveguide 605. The surface assembly 130 includes an emitter array 615, an emitter coupler 630, a detector array 640, a detector coupler 645, and reflectors 625 attached to the waveguide 605. Instead of emitters and detectors positioned along the entire periphery of the active area 131, a single emitter array 615 and detector array 640 can be used in combination with reflectors 625 and coupler 630, 645. Specifically, reflectors 625 are arranged along the top, left, and right sides of the active area 131. The remaining components are positioned along the bottom side. However, the emitter array 615, emitter coupler 630, detector array 640, detector coupler 645, and reflector 625 positions can be arranged differently. For example, additional emitter/detector arrays and couplers can be positioned along the periphery.

As described above, optical beams travel through the waveguide 605 using TIR. That is, optical beams reflect off the top and bottom surfaces of the waveguide 605 at angles greater than a critical angle from the normal of the top and bottom surfaces of the waveguide 605. The angle of a beam relative to the plane of a surface on which it is incident (e.g., the top or bottom surface of the waveguide) may be referred to as the elevation angle or propagation angle. The angle of a beam relative to the normal of a surface on which it is incident may be referred to as the zenith angle. The elevation angle is equal to ninety minus the zenith angle.

The waveguide 605 may be constructed of a material that is rigid or flexible. Furthermore, the waveguide 605 can include one or more layers of material. These layers may be of similar indices of refraction and behave much like a single body of material, or they may have different indices of refraction. In some situations, beams travel through all of the layers of the waveguide 605 and in other situations beams may only travel through a subset of the layers. This can be due to the indices of refraction of the waveguide layers, the elevation angle of the beams, and the wavelengths of the beams. In the embodiment shown in FIG. 6, the waveguide 605 has a top surface that is substantially or exactly parallel to its bottom surface. The top surface of the waveguide is oriented to receive touch input. Although the waveguides within the current disclosure are rectangular planar waveguides it should be appreciated that any shape and type of waveguide can be used. For example, the surfaces of the waveguide may be curved.

The emitter coupler 630 (or couplers) redirect beams emitted from the emitter array 615 (or emitter arrays) to have elevation angles such that they propagate through the waveguide 605 via TIR. The reflectors 625 may redirect beams that are coupled into the waveguide 605 such that optical beams sufficiently cover the active area 131 to provide the desired touch resolution and are ultimately redirected to the detector array 640. Thus, touch events can be detected anywhere on the active area 131. Beams 1, 2, and 3 are illustrated to demonstrate example beam paths. Beams 1 and 2 intersect at the location of touch event 1 and can thus be used to detect that touch event as propagation of these beams to the detector array 640 may be partially or completely prevented by the touch event. Beam 3 illustrates that the reflectors 625 can be configured to reflect beams in any arbitrary direction.

The optical touch-sensitive device 100 can be configured to operate in conjunction with a display (or screen) module configured to display images, however the display module is not necessarily part of the optical touch sensitive device 100. In some applications, the waveguide can be placed in front of the display device and can extend past the lateral edge of the display module. In other applications, the waveguide can be formed on the front of the display device.

In the embodiment shown in FIG. 6, the emitter array 615 is located below the waveguide (e.g., along the periphery of the active area 131) and produces optical beams that enter the waveguide through bottom surface of the waveguide e.g., by the emitter coupler 630. The emitter array 615 can be any arrangement of the one or more previously described emitters. For example, the emitter array 615 includes a one or two-dimensional array of LEDs. The detector array 640 is also located below the waveguide (e.g., along the periphery of the active area 131) and receives optical beams redirected by the detector coupler 645. The detector array 640 can be any arrangement of the one or more previously described detectors. For example, the detector array 640 includes a one or two-dimensional array of photodiodes. The detector array 640 can also be a camera or other image sensor, such as a complementary metal-oxide-semiconductor (CMOS) detector.

B. Couplers and Reflectors

The couplers 630, 645 and reflectors 625 are optical structures that can direct, widen, slim, reflect, diffract, refract, disperse, amplify, reduce, combine, separate, polarize, or otherwise change properties of the beams as they propagate through the waveguide. Furthermore, each coupler or reflector can perform one or more of these effects. To do this, the coupler and reflector structures can include metalized features, optical gratings, mirrors, prismatic structures, Fresnel structures, corner reflectors, retroreflectors, and the like. In the description, the couplers and reflectors are described in terms of 'redirecting' optical beams, however this is for purposes of simplicity of description to include any one or more of the beam property changes described above as well as any other manipulation of optical beams not specifically called out above.

The height of the couplers 630, 645 and reflectors 625 can be less than or equal to 500 micrometers. In some embodiments, a coupler and/or reflector is a portion of a film and the thickness of the film is less than or equal to 500 micrometers (although the optical structure itself may be less than or equal to one hundred micrometers high). Any number of couplers and reflectors may be positioned on the waveguide, and the couplers and reflectors can be attached to or a part of any surface of the waveguide, such as the top, side, and/or bottom surfaces. Couplers and reflectors at the side surfaces of the waveguide may be coupled through air into the waveguide (see, e.g., FIG. 9B). The couplers and reflectors may be made with any number of materials including, for example, metal, glass, and polymers.

The reflector 625 includes one or more optical structures that redirect optical beams propagating in the waveguide 605 according to a predetermined pattern. The emitter coupler 630 includes one or more optical structures that redirect optical beams from the emitter array 615 according to a predetermined pattern. Predetermined patterns generally include a pattern of beams paths that originate from the emitter array 615, provide desired coverage of the active area 131, and redirect towards the detector array 640. Thus, the emitter coupler 630 may couple beams from the emitter array 615 into the waveguide. Similar to the emitter coupler 630, the detector coupler 645 includes one or more optical structures that receive optical beams propagating through the waveguide according to the predetermined pattern and redirect the beams to the detector array 640. This may include coupling beams from the waveguide into the detector array 640. Each emitter array 615 and detector array 640 may have its own coupler, and, as illustrated in FIG. 6B, the couplers or associated structures can physically connect the arrays to the waveguide. Among other advantages, an emitter coupler 630 can redirect beams from a concentrated optical source, such as an emitter array 615, and distribute it widely over a large active area 131. Similarly, a detector coupler 645 can redirect beams from a wide range of angles and concentrate them onto a concentrated detector source, such as a detector array 640.

Couplers and reflectors can also be designed to change beam footprints. Beams with smaller footprints are more sensitive to touch events while beams with wider footprints can cover a greater proportion of the active area 131. Thus, by having different beam footprints, the touch device 100 can have different touch sensitivity levels. Additionally, beam footprints can be used for touch object differentiation. For example, a slim stylus tip may affect a wide beam footprint differently than a finger. Generally, the couplers and reflectors can be designed to provide almost any desired distribution of beam directions and footprints.

The couplers 630, 645 and reflectors 625 can be manufactured on the waveguide, formed as a part of the waveguide (e.g., integrated into a portion of the waveguide), or be part of a separate component that is added to the waveguide. For example, the couplers and reflectors can be formed by extrusion or injection molding. In one embodiment, the couplers and reflectors are a portion of a flexible thin film 610 attached to a surface of the waveguide 605, such as at or near the periphery. The film 610 can include a protective layer and reduce installment complexity. In another embodiment, the structures of the couplers and reflectors can be formed directly onto a surface of the waveguide by methods such as hot embossing (e.g., for polymer waveguides), UV embossing, casting (e.g., for glass or polymer waveguides), etching (e.g., for glass or polymer waveguides), or ablation (e.g., for glass or polymer waveguides). Alternatively, another layer (e.g., a polymer which can be cast into the desired shape) can be attached directly onto the waveguide surface. Among other advantages, due to the manufacturing methods, embodiments of the couplers and reflectors can be low profile structures. For example, through hot embossing, the structures can have heights ranging from 1 millimeter (mm) to several hundred micrometers, and through hot or UV embossing the structures can have heights ranging from a few micrometers to 100 micrometers.

In the example of UV embossing, a film 610 with a liquid resin coating is passed under a roller. The roller includes a negative of the intended structure on its surface. The liquid coating is shaped by the roller and UV energy (typically from a source under the film and passing through it) triggers crosslinking polymerization within the liquid, curing it into the intended shape. The result is a film with a cured resin layer on top which can have a sophisticated surface profile. Optional layers, such as adhesive coatings on the underside and metallization layers on the structure side can be applied to the film to form the desired structure. The film can then be applied to the waveguide surface. In some embodiments, the film is a part of the waveguide itself. Among other advantages, the waveguide, couplers, and reflectors can be produced from high-volume roll-to-roll manufacturing methods.

Couplers and reflectors are further described below. The optical structures of couplers and reflectors can be similar. Thus, a concept, design, arrangement, etc. for a given coupler or reflector may also be applied to other couplers and reflectors. Furthermore, the couplers and reflectors can alter properties of the beams not specifically illustrated in the figures. For example, couplers and reflectors may change the beam width footprints and/or redirect optical beams into or out of the page. Couplers and reflectors may also shift the apparent endpoint of the beam or reflected beam. Descriptions of components in a figure may be applicable to similar components in other figures. Additionally, due to manufacturing imperfections, redirected optical beams may not be directed at the exact angles intended or expected. However, the angles of the redirected optical beams may be substantially equal to those described or shown (e.g., within 1 or 2 degrees).

C. Example Coupler and Reflector Arrangements

Figure 7A:
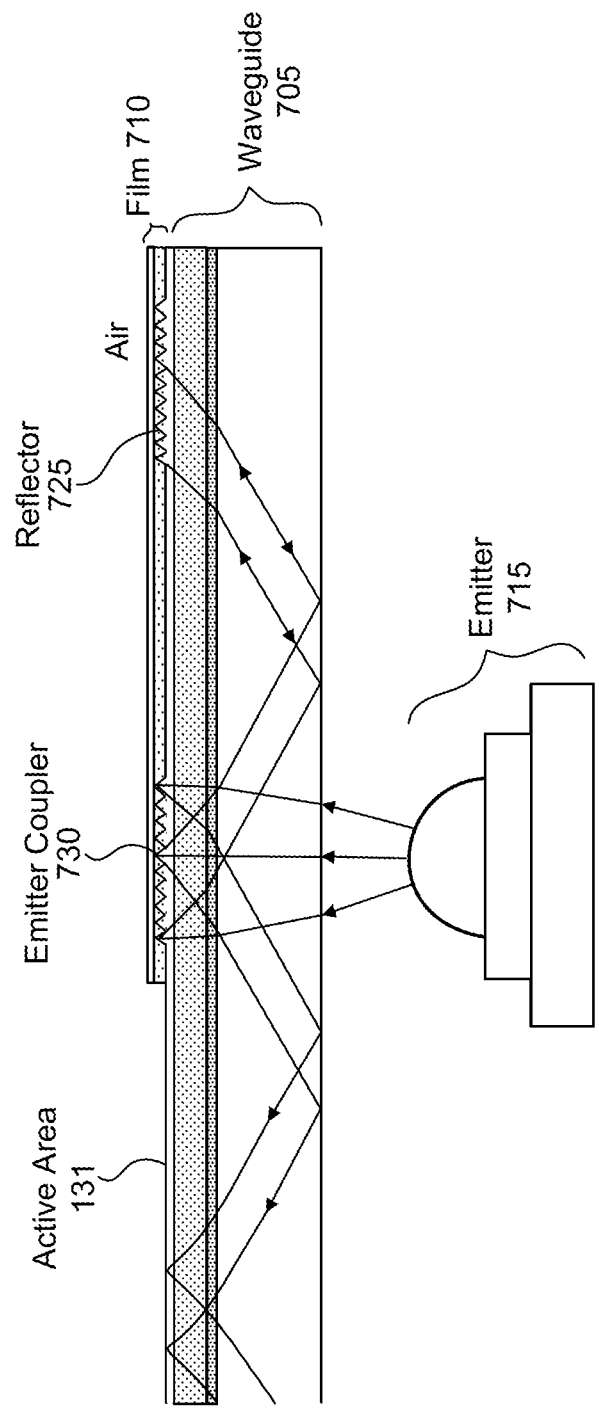
FIGS. 7A and 7B are cross-sectional portions of a waveguide with an emitter coupler and reflector in a thin film on the top surface, according to some embodiments.
Figure 7B:
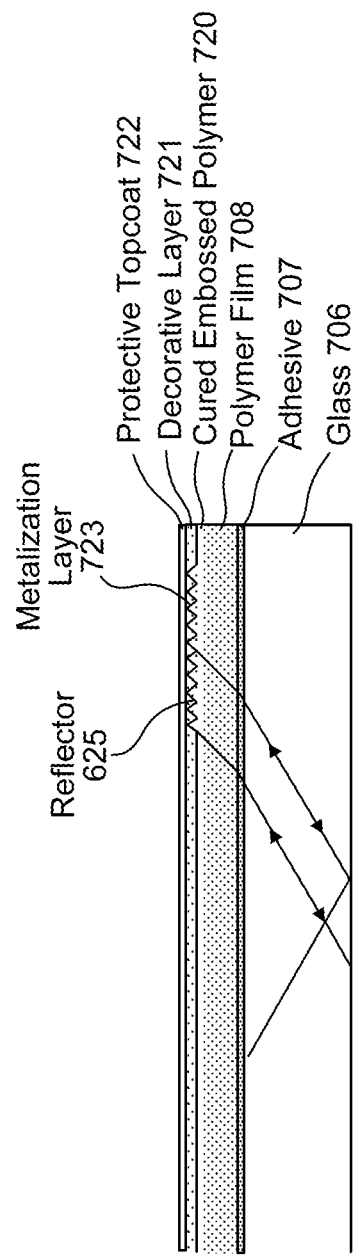

FIGS. 7A and 7B are cross-sectional portions of a waveguide 705 with an emitter coupler 730 and reflector 725 in a film 710 on the top surface, according to some embodiments. FIG. 7C is a top view of the emitter coupler 730 and reflector 725, according to an embodiment. The emitter coupler 730 and reflector 725 are a part of a film 710 attached to the periphery of the top surface of the waveguide 705. The emitter 715 is below the waveguide and aligned with the emitter coupler 730. Thus, beams enter the waveguide through the bottom surface and are incident on the emitter coupler 730. The emitter coupler 730 changes the angle of the beams so that the beams propagate via TIR. As seen in FIG. 7C (the top view), the emitter coupler 730 distributes the beams in a radial pattern. The reflector 725 is placed between the emitter coupler 730 and the edge of the waveguide 705 to redirect beams heading towards the edge (that would otherwise be lost) towards the active area 131 (e.g., towards the detector array 740, another reflector 725, etc.).

The waveguide 705 includes several layers. In the embodiments shown, the layers include a bottom glass layer 706 attached by adhesive 707 to a top polymer film 708. The glass layer 706 can also be a polymer, such as Polyethylene terephthalate (PET), Poly(methyl methacrylate) (PMMA), Polycarbonate (PC), or Polysiloxane (silicone), although any optically transmissive polymer may be suitable. Note that Polydimethylsiloxane (PDMS) can be suitable for making molds for microstructures. The glass layer 706 can provide structural support to the other layers of the waveguide. The emitter coupler 730 and reflector 725 are a part of a film 710 attached to the top surface of the waveguide 705. The film 710 can include a cured embossed polymer 720 in contact with the waveguide, a metallization layer 723 and a decorative layer 721 and a protective topcoat 722 on the polymer 720. The cured embossed polymer includes the emitter coupler 730 and reflector 725. The protective topcoat 722 can protect the film 710 from being damaged and the decorative layer 721 can visually cover the coupler 730 and reflector 725 from a user of the touch device 100. The metal layer 723 can allow the cured embossed polymer layer 720 to form reflectors 625 which are capable of redirecting beams. For example, reflectors 625 can redirect beams at smaller angles of incidence than might be possible with TIR (based on the refractive index difference between the cured polymer and the adjoining material) alone. The total height of the film 710 and top layers of the waveguide 705 (excluding the glass layer 706) be range from 50 to 500 μm.

Alternative layers in the film 710 may be an air gap instead of the metallization layer 723 (where the air is trapped between the recesses in the embossed polymer 720 and the layer above the embossed polymer 720). For example, the decorative layer 721 can be a tape with adhesive on the underside which is applied to the embossed polymer 720, trapping air in the process. The air offers a low refractive index material off which beams in the embossed polymer 720 can be redirected.

The emitter coupler 730 and reflector 725 include an array of reflective structures to redirect the beams. These structures can be metalized e.g., the reflector 725 is an array of plane mirrors. As seen in FIG. 7C, the reflected beams 735 propagate towards the active area 131 as if they were produced from a second emitter. Due to the physical arrangement of the coupler 730 and reflector 725, additional emitters can be virtualized and, thus, the coverage area of the active area 131 can be increased without increasing the number of emitters or emitter arrays. Alternatively, if emitter coupler 730 redirects beams only towards the reflector 725, the reflected beams 735 can make the apparent emitter location to be along the reflector 725. In some embodiments, the reflected azimuth angles of the beams 735 do not match the incident azimuth angles of the beams 735. For example, the reflector 725 has non-linear optical structures (e.g., a chevron pattern) that decrease the reflected azimuth angles of the reflected beams 735. In another example, beam 3 of FIG. 6B has a sharp reflected azimuth angle compared to beams 1 and 2.

Figure 8A:
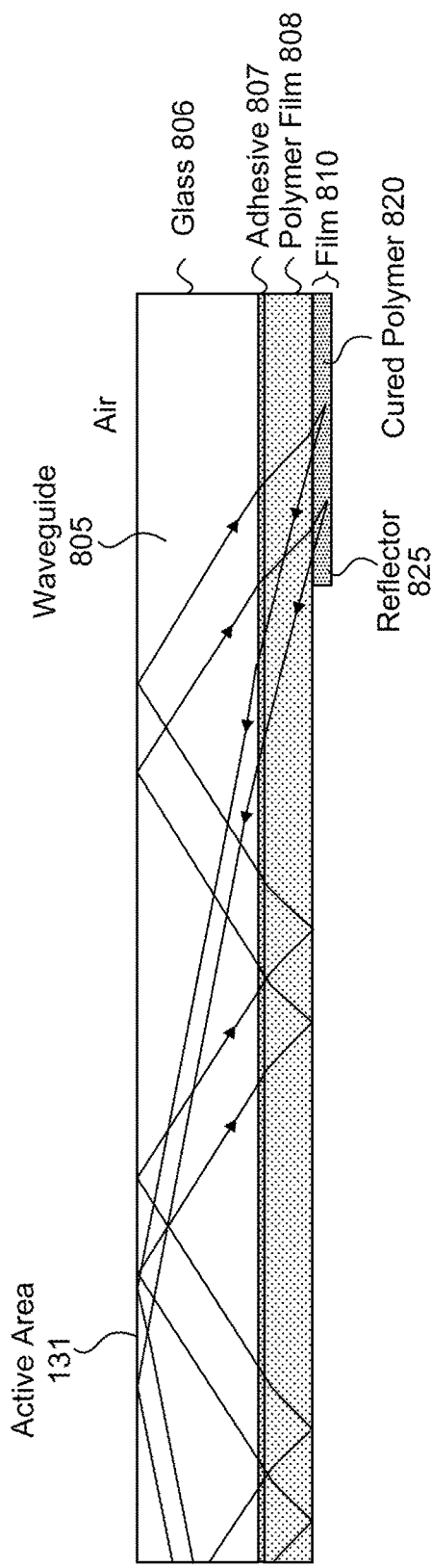
FIGS. 8A and 8B illustrate cross-sectional views of a waveguide with reflectors on the bottom surface, according to some embodiments.
Figure 8B:
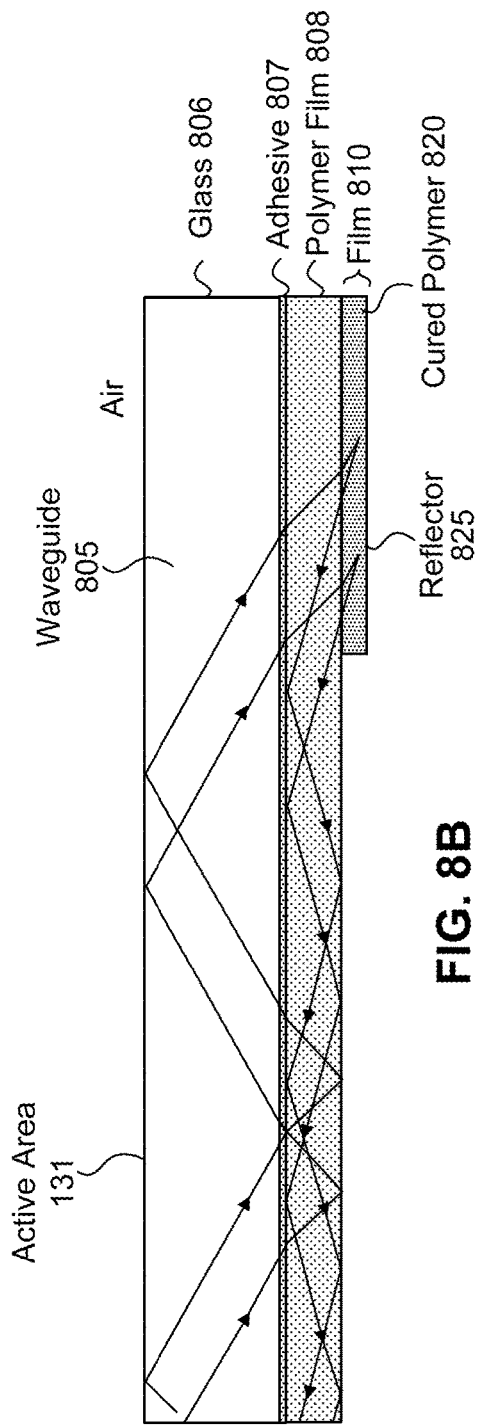

FIGS. 8A and 8B illustrate cross-sectional views of the waveguide 805 with reflectors 825 on the bottom surface, according to some embodiments. In the example of FIGS. 8A and 8B, the waveguide includes a glass layer 806 attached to the top surface of the polymer film 808. A film 810 includes a reflector 825 in a cured polymer 820 attached to the bottom surface of the polymer film 808. In some embodiments, the height of the glass layer 806 is four millimeters and the total height of the remaining layers (including the film layers 810) is one hundred micrometers. Among other advantages, reflectors (and couplers) on the bottom surface of the waveguide 805 are protected (e.g., from touch events) by the waveguide itself and, thus, a protective layer is not applied. The reflectors 825 do not have to be in a film 810 and the layers of the waveguide 805 and film 810 are not limited to those described in FIGS. 8A and 8B.

FIGS. 8A and 8B also illustrate reflectors 825 that change the elevation angle of beams (e.g., from thirty to fifteen degrees, which is a zenith angle change from sixty to seventy-five degrees). Before reflection, the optical beams travel through the waveguide 805 via TIR at an initial elevation angle. After redirection, the beams travel at a smaller elevation angle. Among other advantages, changing the elevation angle of beams can change the sensitivity of the beams to touch events. This is because the zenith angle can be larger than the critical angle for the waveguide material and a touch material. Also, due to the angle change, redirected optical beams may only travel through a subset of the layers of the waveguide. In FIG. 8B, the redirected optical beams are redirected by the adhesive 807 so that the beams travel via TIR in the polymer film 808. As a result, the redirected optical beams may not propagate through the glass layer 806 and are therefore not affected by touches. For example, if n=1.41 (a typical value for a silicone adhesive) for the adhesive 807 and n=1.56 (a typical value for a polycarbonate film) for the polymer film 808, beams with zenith angles greater than about 65 degrees will travel via TIR through the polymer film 808. For reference, example indices of refraction for the other layers include n=1.51 for the glass layer 806 and n=1.49 for the cured polymer 820.

In FIG. 8A, the redirected beams continue to propagate through all layers of the waveguide 805. However, due to the smaller elevation angle and the index of refraction of touch objects, the beams may be less sensitive or insensitive to touch events. For example, if the glass waveguide layer 806 is a PET film or sheet with n=1.64 and beams have an elevation angle of nineteen degrees, touch objects with n<1.55 will not affect the beams (typical fingers have n values from 1.45 to 1.55). In another example, if n=1.51 for the glass layer 806, beams with an elevation angle of fifteen degrees will not be affected by touch objects with n<1.458. For reference, example indices of refraction for the other layers include n=1.49 for the adhesive 807, n=1.56 for the polymer film 808, and n=1.49 for the cured polymer 820. In other embodiments, the various components may have different refractive indices.

In some embodiments, elevation angles can be used to distinguish touch types. For example, a group of beams are propagating at a first elevation angle (e.g., thirty degrees) and another group of beams are propagating at a second elevation angle (e.g., fifteen degrees). Thus, depending on the materials of the waveguide, finger touches may affect the beams with the first elevation angle and styli with material tips (e.g., with a high index of refraction) may affect one or both sets of beams. In these embodiments, reflectors may retain the incident elevation angles of beams instead of changing them.

Embodiments are not limited by those illustrated in FIGS. 8A and 8B. For example, the reflectors 825 may change the elevation angle from an initial elevation angle to a larger elevation angle, rendering the beams sensitive or more sensitive to touch events after redirection.

Figure 9A:
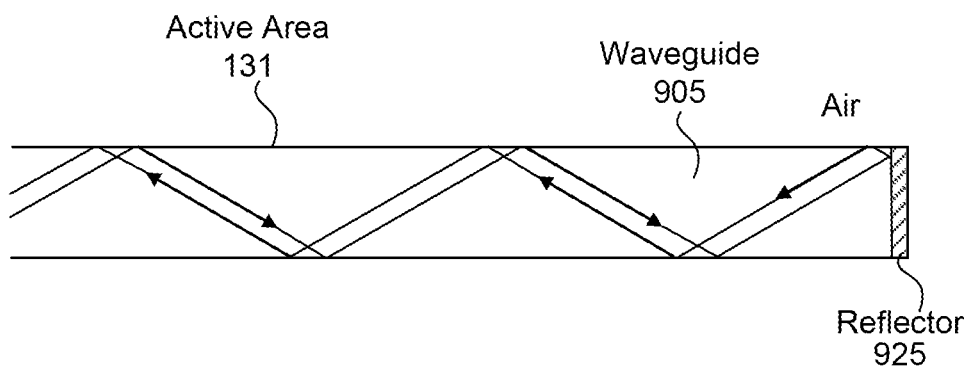
FIGS. 9A-9C illustrate reflectors on sides of the waveguide, according to some embodiments.
Figure 9B:
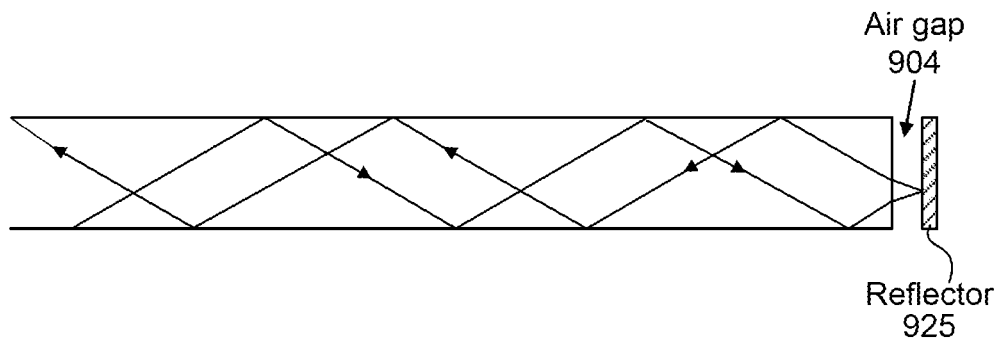
Figure 9C:
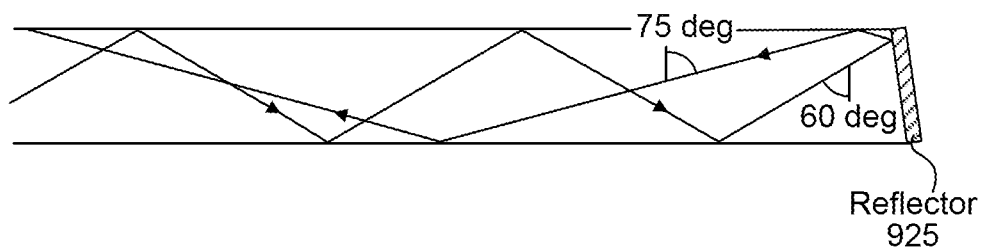

FIGS. 9A-9B illustrate reflectors 925 on sides of the waveguide 905, according to some embodiments. The example waveguides 905 shown include a single layer, however additional layers may be present. In FIG. 9A, the reflector 925 is vertical and directly attached to the side of the waveguide 905. Thus, redirected beams have the same or similar elevation angles as the incident beams. FIG. 9B is similar to FIG. 9A, except that an air gap 904 is between the reflector 925 and waveguide. Among other advantages, this can avoid a difficult manufacturing step of attaching the reflector to a narrow edge of the waveguide. For example, the reflector can be part of a waveguide housing. The air gap 904 can be increased or decreased to alter the beams as desired. The air gap 904 is preferably small to minimize beam lost above and below the reflector 925. The height of reflector 925 can be larger than the waveguide 905 thickness to simplify alignment of the waveguide 905 and reflector 925. In FIG. 9C, the reflector 925 is directly attached to the waveguide and placed at an angle (e.g., 7.5 degrees) relative to the normal of the top surface. Thus, the elevation angles of the redirected beams are changed relative to the incident beams (e.g., from thirty to fifteen degrees). Note that the angles shown in FIG. 9C are zenith angles. In these examples, the reflectors 925 can be simple mirrors or a more complicated optical structure (e.g., if other optical effects are desired). In some embodiments, side reflectors 925 are used in conjunction with reflectors on other surfaces of the waveguide 905.

Figure 10A:
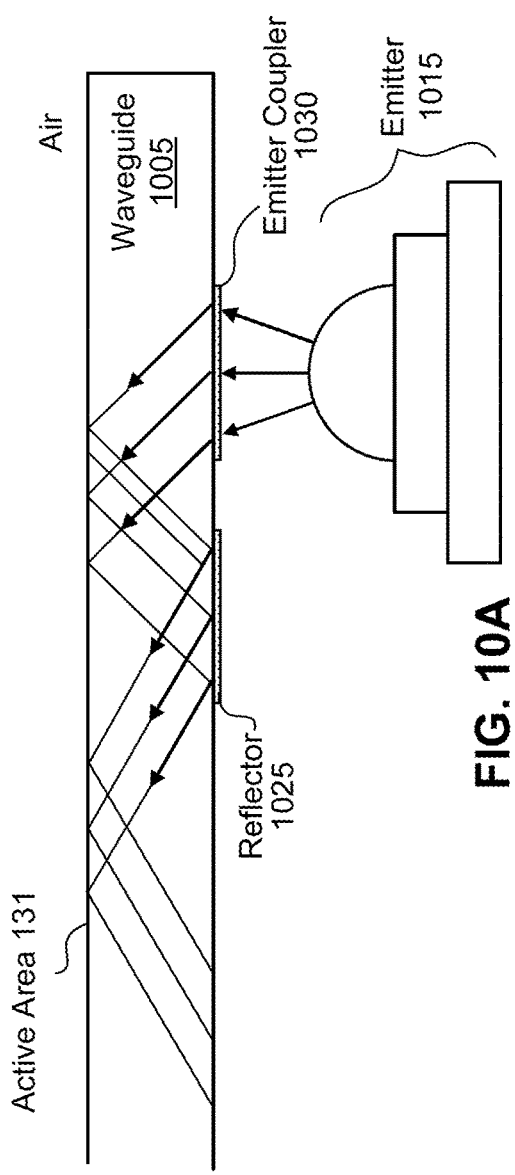
Figure 10B:
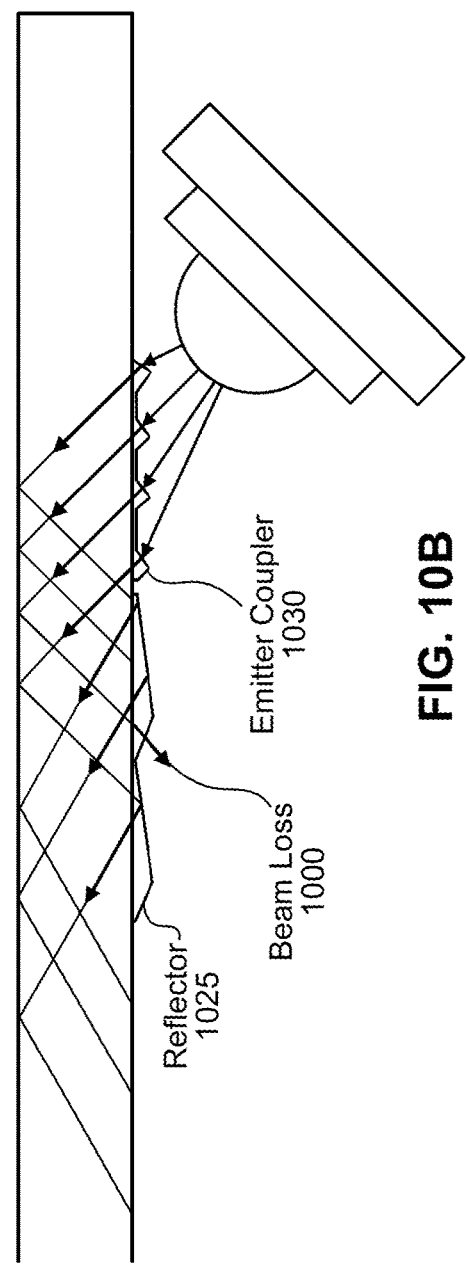

FIGS. 10A-10D illustrate various emitter coupler 1030 and reflector 1025 arrangements, according to some embodiments. FIGS. 10A and 10B each illustrate an emitter coupler 1030 and reflector 1025 on the bottom surface, FIG. 10C illustrates an emitter coupler 1030 on the bottom surface and a reflector 1025 on the top surface, and FIG. 10D illustrates an emitter coupler 1030 as a part of the top surface of the waveguide 1005. Emitter couplers 1030 on the bottom surface can include transparent materials and may increase the proportion of optical energy coupled into the waveguide 1005. Emitter couplers 1030 on the bottom surface may couple beams into the waveguide 1005 via diffractive or refractive effects (e.g., the emitter coupler 1030 is a diffraction grating or changes the angle of incident beams via refraction such that the elevation angle is sufficient for the beams to propagate via TIR).

In FIGS. 10A-10C, each emitter coupler 1030 couples optical beams into the waveguide. The optical beams then propagate via TIR through the waveguide due to the elevation angle imparted by the coupler 1030. Furthermore, each reflector 1025 decreases the elevation angle of the beams coupled by the emitter coupler 1030, for example, to obtain a desired elevation angle or to decrease the elevation angle to one that is sufficient for TIR to occur. In FIG. 10A, the emitter 1015 emits beams substantially perpendicular (e.g., within one or two degrees) to the bottom surface of the waveguide, while in FIGS. 10B-10D, the emitter 1015 is tilted at an angle relative to the bottom surface of the waveguide. Arrangements with tilted emitters 1015 may have an increased coupling efficiency compared to arrangements without tilted emitters 1015.

The reflector 1025 and emitter coupler 1030 of FIG. 10A are thin films attached to the bottom surface. In FIG. 10D, the emitter coupler 1030 is a part of the waveguide 1005 itself. This may be formed by embossing or curing the coupler pattern directly onto the waveguide 1005 (e.g., the waveguide is a polymer sheet). In some embodiments, the emitter coupler 1030 of FIG. 10D is less than or equal to one millimeter (this may be integrated into portion of a waveguide that is several millimeters thick). The reflectors 1025 of FIGS. 10B-10C and the emitter coupler 1030 of FIG. 10D include prismatic structures. The prismatic structures can include repeated inclined surfaces. Compared to other reflector and coupler structures, prismatic structures can be more susceptible to beam losses 1000 and outside beam intrusion 1001. However, prismatic structures may be advantageous because they do not need to be metallized, and thus can be easier to manufacture, and can be less sensitive to being damaged (e.g., from impact or strong touch events). Thus, prismatic structures can be placed on the top surface without a protective film.

Figure 11:
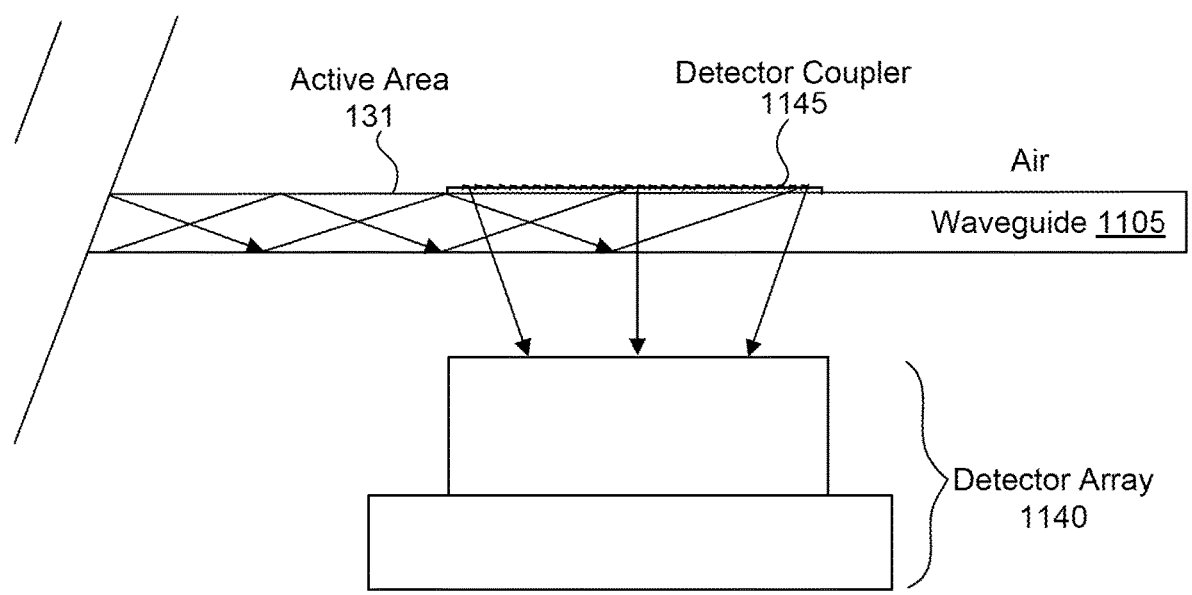
FIG. 11 is a cross-sectional view of a detector coupler reflecting beams to a detector array, according to an embodiment.

FIG. 11 is a cross-sectional view of a detector coupler 1145 redirecting beams to a detector or detector array 1140, according to an embodiment. Beams travel via TIR in the waveguide 1105 from the active area 131 and are incident on the detector coupler 1145. The detector coupler 1145 redirects beams towards the detector array 1140. The redirected beams travel through the bottom surface of the waveguide 1105 and are incident on the detector array 1140. The waveguide 1105 can include additional layers. Although not illustrated, other optical effects can be performed by the detector coupler 1145. For example, the detector coupler 1145 can redirect optical beams to an appropriate detector in the detector array 1140 even if the beams are received at various elevation angles and directions. Different detector couplers 1145 may be designed for various touch device arrangements and predetermined patterns.

Figure 12:
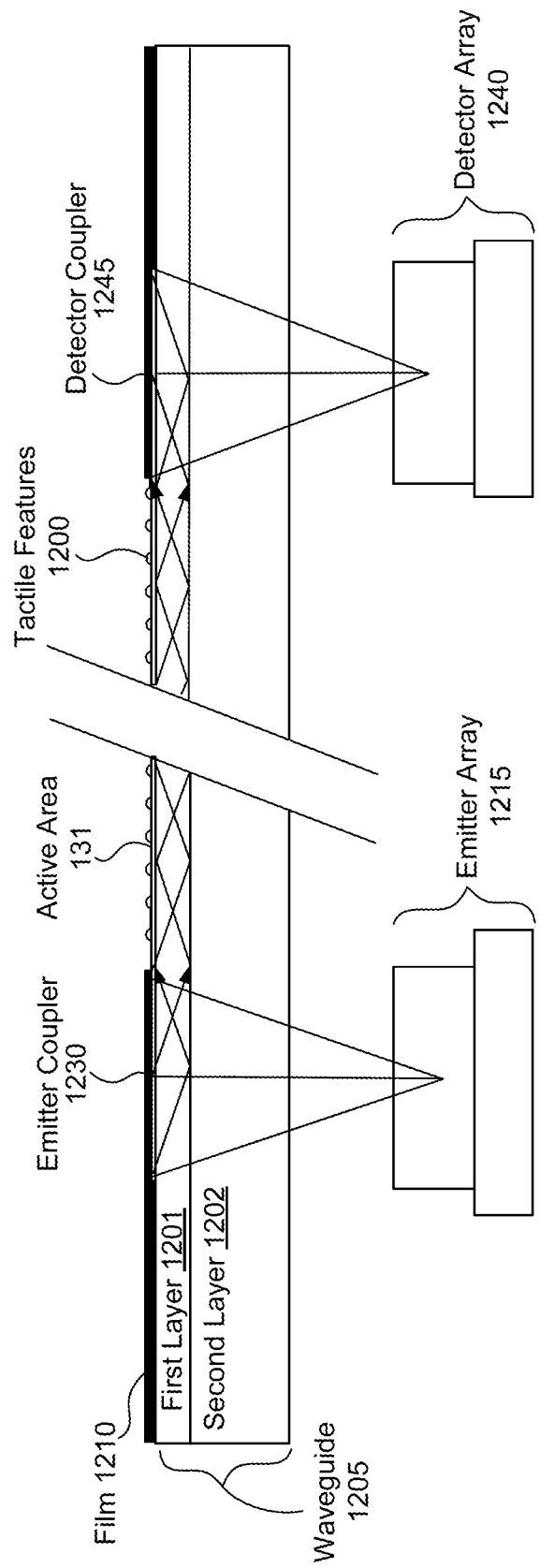
FIG. 12 is a cross-sectional view of beams reflected into and out of a waveguide by couplers, according to an embodiment.

FIG. 12 is a cross-sectional view of beams redirected into and out of a waveguide 1205 by couplers 1230, 1245, according to an embodiment. The waveguide 1205 includes a first layer 1201 on top of a second layer 1202. The waveguide 1205 also includes tactile features 1200 on the active area 131. The tactile features 1200 can provide a tactile experience and reduce glare for a user interacting with the touch-sensitive device 100. A film 1210 is attached to the periphery of the top surface of the first layer 1201 and includes an emitter coupler 1230 and a detector coupler 1245. An emitter or emitter array 1215 is below the waveguide 1205 and is aligned with the emitter coupler 1230. Similarly, a detector or detector array 1240 is below the waveguide 1205 and is aligned with the detector coupler 1245. Thus, beams from the emitter array are coupled into the waveguide, propagate via TIR through the first layer 1201, are coupled out of the waveguide, and are received by the detector array 1240.

In the example of FIG. 12, the beams do not travel through the second layer 1202 via TIR. As shown, the beams only travel through the second layer 1202 when being coupled into or out of the waveguide 1205. In some situations, this may be advantageous. For example, the second layer 1202 may be a cover lens for a display screen that does not initially provide touch detection, and the first layer 1201 (and other components) are added to provide touch detection. In another example, the second layer 1202 may be a material through which the beams cannot propagate efficiently via TIR (e.g., infrared wavelengths may not propagate through certain glass types). In some embodiments, the second layer 1202 is 0.7 mm thick glass, the first layer 1201 is a 0.25 mm thick film, the tactile features 1205 are 20 μm thick, and the film 1210 includes a 25 μm thick black lacquer over 27 μm thick couplers 630, 645. The black lacquer layer may protect the couplers 630, 645 from damage during use. Furthermore, the couplers 630, 645 can be less than or equal to two millimeters wide (e.g., 1.6 mm). Similar to FIG. 11, optical effects not illustrated may be performed by the detector couplers. For example, the optical beams may propagate at a predetermined pattern with various elevation angles, for instance, due to the emitter coupler 1230. Furthermore, other optical structures, such as reflectors may be present on the waveguide 1205.

D. Multiple Emitters and Detectors

In some embodiments, it is advantageous to include multiple emitter and detector arrays arranged along one or more sides of the active areas. These embodiments are further described below.

Figure 13:
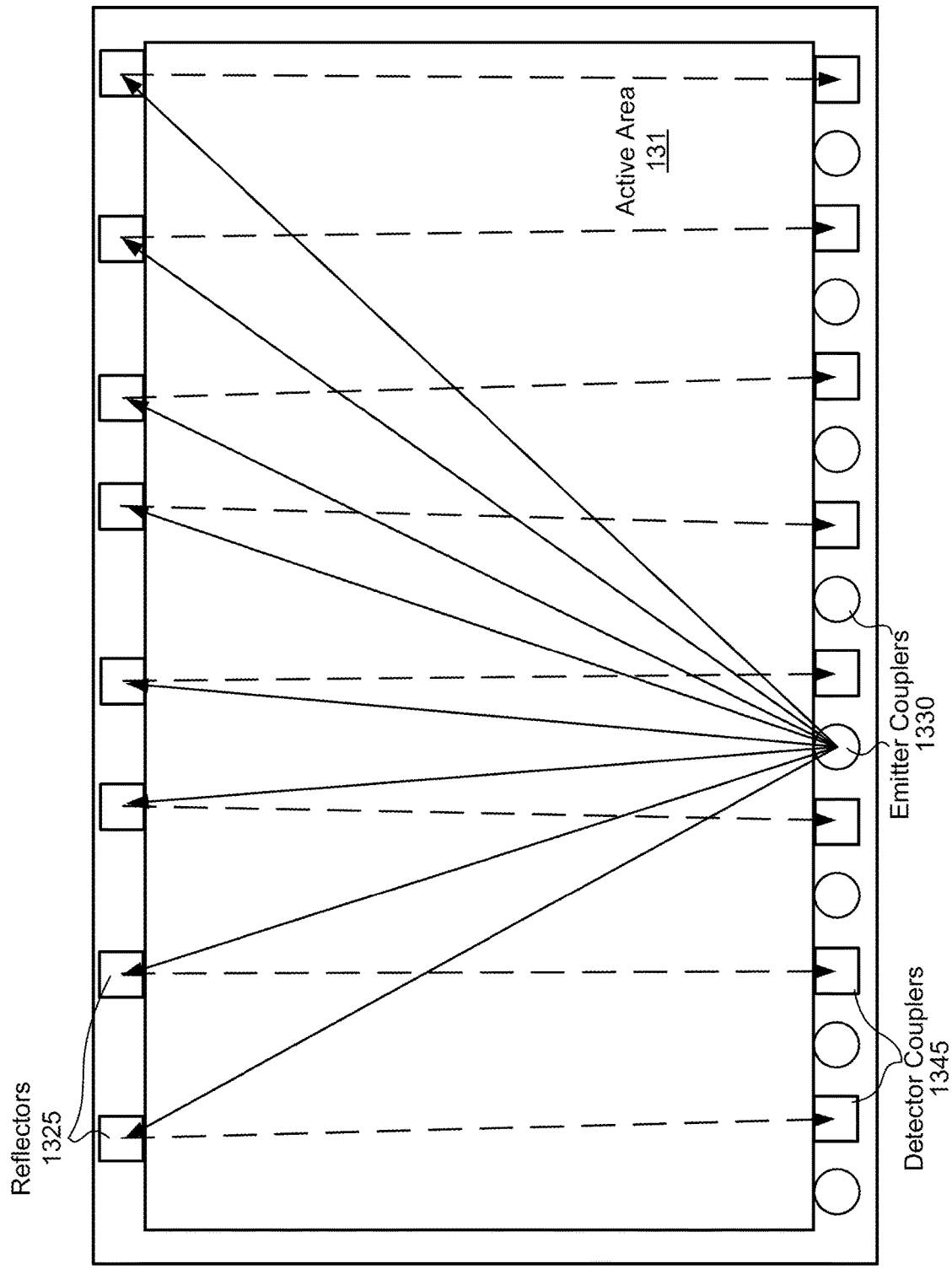
FIG. 13 illustrates an arrangement of couplers and reflectors for creating virtual emitters and detectors, according to an embodiment.

FIG. 13 illustrates an arrangement of couplers 1330, 1345 and reflectors 1325 that can create virtual emitters and detectors, according to an embodiment. Emitter couplers 1330 and detector couplers 1345 are positioned along the bottom side of the active area 131 and reflectors 1325 are positioned along the top side. The emitter couplers 1330 can also be emitters and the detector couplers 1345 can also be detectors. As illustrated, optical beams are directed from a central emitter coupler 1330 towards the reflectors 1325 along the top side. The reflectors 1325 redirect the incident beams back towards the detector couplers 1345 along the bottom side. In some embodiments, different and/or other components than those shown in FIG. 13 may be included. For example, additional reflectors or emitter/detector arrays may be arranged on the sides of the active area 131.

In some embodiments, the reflectors 1325 can appear as virtual detectors. For example, the incident beams may be sensitive to touch events and the reflectors 1325 change the elevation angle of the beams such that the redirected beams are insensitive to touch events. Thus, the detector couplers 1345 operate as if they are at the location of the reflectors 1325 because only the beam paths from the coupler 1330 to the reflectors 1325 are touch sensitive. In this way, the reflectors 1325 are virtual detectors. Similarly, the reflectors 1325 can appear as virtual emitters. For example, the incident beams may be insensitive to touch events and the reflectors 1325 change the beams such that the redirected beams are sensitive to touch events. Thus, the emitter couplers 1340 operate as if they are at the location of the reflectors 1325 because only the beam paths from the reflectors 1325 to the detector couplers 1345 are touch sensitive. Furthermore, combinations of virtual emitters and detectors can be used. For example, the predetermined pattern of the emitter coupler 1330 includes touch sensitive and insensitive beams and the reflectors (or portions of reflectors) are designed to redirect touch sensitive beams as touch insensitive beams and redirect touch insensitive beams as touch sensitive beams. In another example, one or more emitter couplers 1330 emit touch sensitive beams and one or more different emitter couplers 1330 emit touch insensitive beams. Among other advantages, virtual emitters and detectors decreases manufacturing cost and complexity because, emitters and detectors are not installed along the entire periphery of the active area 131. Also, using thin reflectors described in this disclosure, the physical bulk of the reflectors is typically smaller than that of emitters and detectors along the periphery.

In the embodiment illustrated in FIG. 13, the reflectors 1325 are dithered (unequally spaced) along the top side. Dithering, can optimize the distribution of beam paths in the active area 131 and can increase the coverage area of the active area 131 without increasing the number of emitters. Without couplers and reflectors, emitters and detectors may be dithered on a PCB, which can be costly and difficult to manufacture, especially for touch devices with large active areas 131. Thus, dithering by couplers and reflectors, can decrease manufacturing complexity by allowing emitters and detectors to be manufactured on PCBs without dithering.

Figure 14:
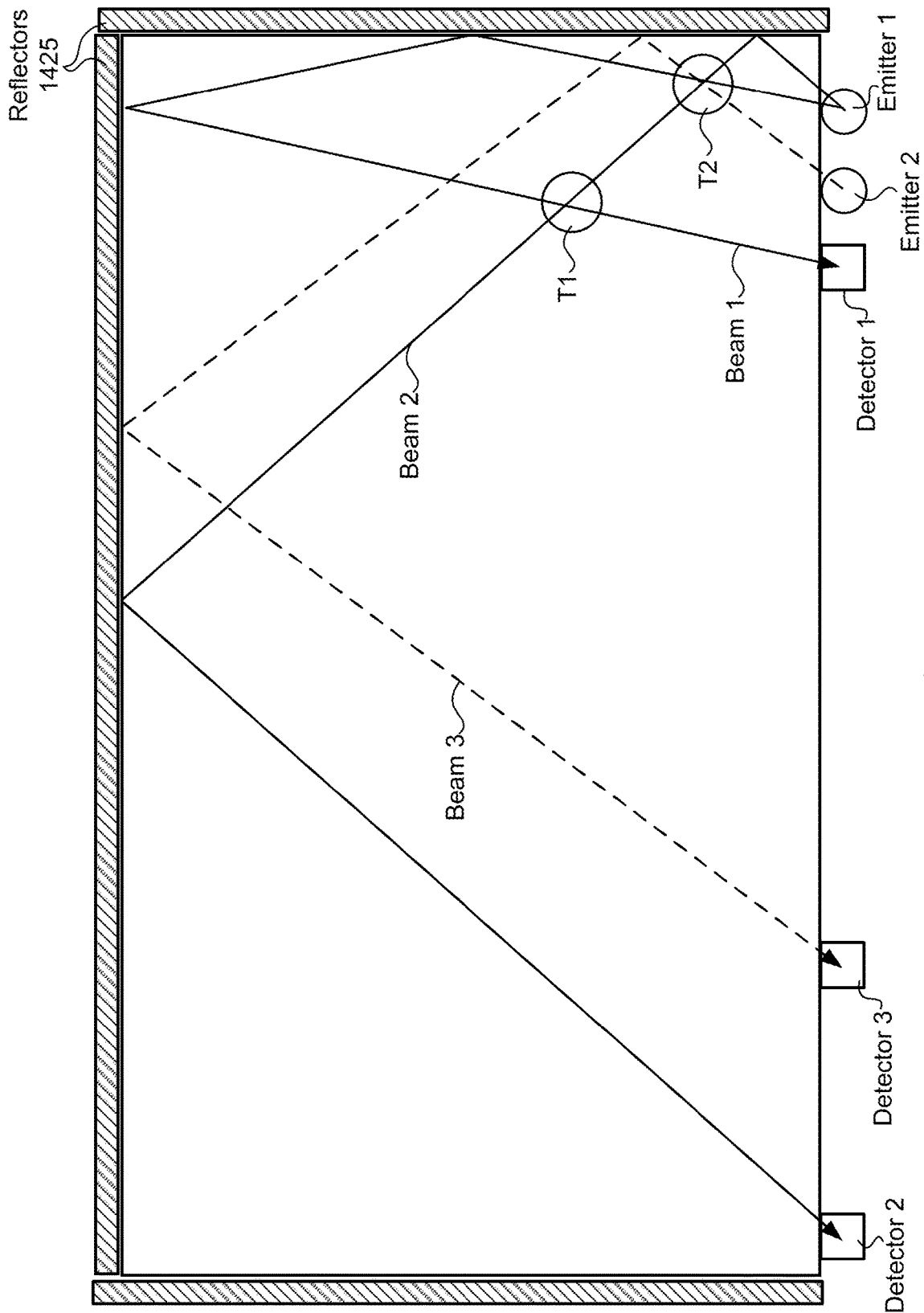
FIG. 14 illustrates a predetermined beam pattern to determine example touch event locations, according to an embodiment.

FIG. 14 illustrates a predetermined beam pattern to determine example touch event locations, according to an embodiment. Emitters 1 and 2 and detectors 1, 2, and 3 are arranged along the bottom side of the active area 131 and reflectors 1425 are arranged along the top, left, and right sides. Emitter 1 emits beams 1 and 2, detector 1 receives beam 1, and detector 2 receives beam 2. Emitter 2 emits beam 3 (dashed line) and detector 3 receives beam 3. Beams 1 and 2 can each be affected by a touch event at locations T1 or T2. Thus, determining whether a touch event occurs at location T1 or T2 based solely on beams 1 and 2 can be difficult or impossible. However, since beam 3 passes through location T2 and does not pass through location T1, the location of the touch event can be disambiguated as either being at location T1 or T2 by measuring beams 1, 2, and 3. Furthermore, by considering additional beams, simultaneous multiple touch events can be identified and disambiguated from single touches.

E. Example Reflectors

FIGS. 15-18 illustrate examples reflector structures, according to some embodiments. The reflectors may be a linear or planar array of optical structures. The reflectors can be extended along a side (or portion of a side) of an active area e.g., similar to the reflector 725 of FIG. 7C. Furthermore, each of the reflectors include reflective structures that can be metal or include metalized features.

Figure 15:
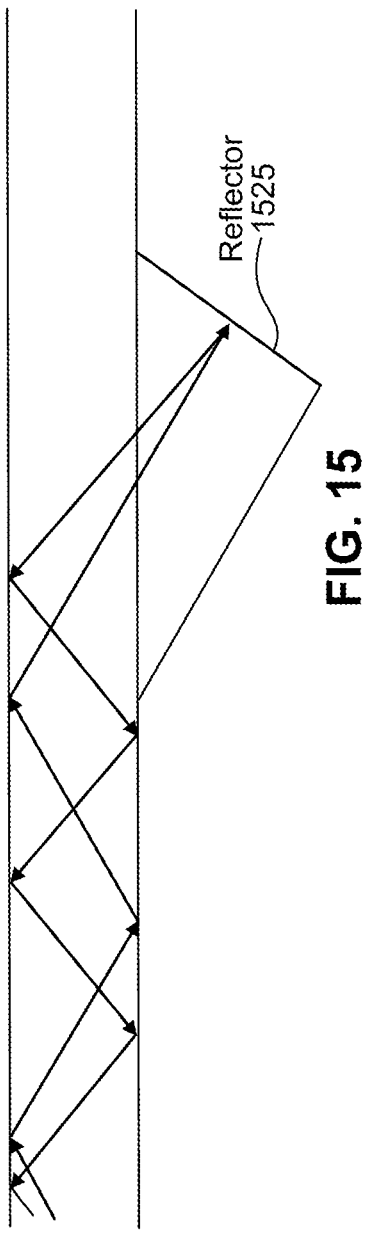
FIGS. 15-18 illustrate example reflector structures, according to some embodiments.

FIG. 15 illustrates a cross-sectional view of a reflector 1525, according to a first embodiment. The reflector 1525 includes a triangular structure on the bottom surface of the waveguide. The triangular structure includes a reflective surface (e.g., a metalized surface) that redirects incident beams away from the reflector 1525. The reflective surface of the structure is tilted at an angle relative to the normal of the top surface of the waveguide. Thus, the redirected optical beams have a different elevation angle than the incident optical beams. In the example of FIG. 15, the elevation angles of the redirected beams are larger than those of the incident beams.

Figure 16:
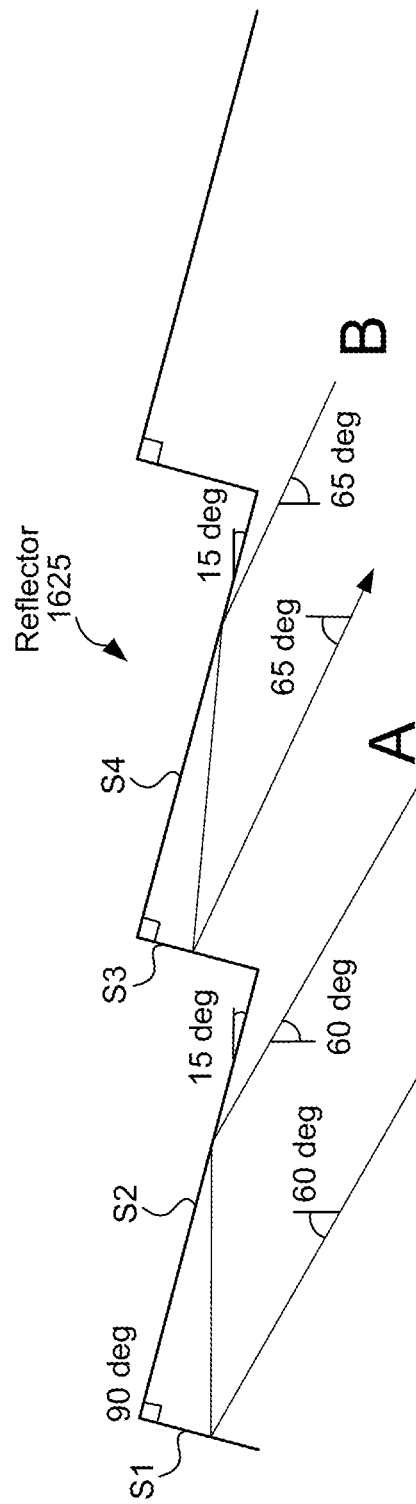

FIG. 16 is a cross-sectional view of a reflector 1625 according to a second embodiment. The reflector 1625 includes a set of repeating inclined reflecting surfaces (e.g., surfaces S1-S4). The reflecting surfaces can be perpendicular to each other. The reflector 1625 is designed to retain the zenith angles of incident beams with sixty degree zenith angles. Although each set of repeating surfaces in FIG. 16 are identical, each set of repeating surfaces can be different (e.g., each set of repeating surfaces can be designed to retain other zenith angles). Example beam A with a zenith angle of sixty degrees is incident on the reflector 1625. Beam A is redirected by S2 into a horizontal path towards S1. S2 is tilted by fifteen degrees with respect to a horizontal line (e.g., a line parallel to the waveguide) and is perpendicular to S1. Beam A is then redirected by S1 away from the reflector 1625 with a zenith angle of sixty degrees. Thus, the initial zenith angle of beam A is preserved. Since the initial and redirected elevation angles are the same, beam A can strike any surface of the reflector 1625 and retain its initial zenith angle of sixty degrees. Although a plane mirror with a normal at sixty degrees can achieve a similar result for beam A (e.g., similar to the reflector in FIG. 9C or FIG. 15), the plane mirror will be less efficient for beams with zenith angles other than sixty degrees. Beams with various zenith angles, for example ranging from sixty to sixty-five degrees, may be propagating in the waveguide. Thus, a plane mirror with a normal at sixty degrees will redirect an incident beam with a zenith angle of sixty-five degrees at a zenith angle of fifty-five degrees. As a result, the reflector 1625 can have a higher efficiency for beams with varying zenith angles. For example, beam B with a sixty-five degree zenith angle strikes S4 and S3 and is redirected away from the reflector with a retained sixty-five degree zenith angle.

Figure 17:
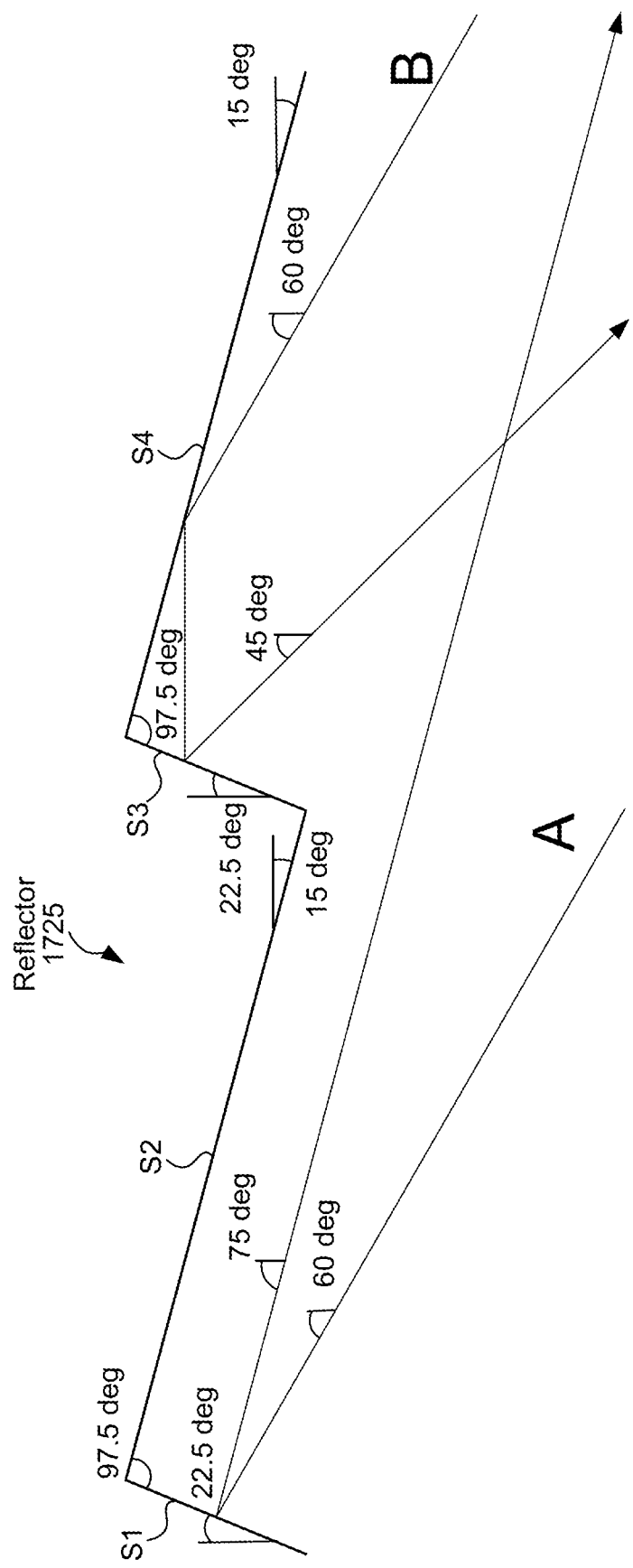

FIG. 17 is a cross-sectional view of a reflector 1725 according to a third embodiment. The reflector 1725 includes alternating reflecting surfaces (e.g., surfaces S1/S3 and S2/S4). The alternating surfaces form 97.5 degrees angles with each other. The surfaces may be metalized to redirect the beams. The reflector 1725 is designed to increase the zenith angles of incident beams (e.g., from sixty to seventy-five degrees). For example, beam A is incident on S1 with a zenith angle of sixty degrees. Upon redirection from S1, beam A propagates with a zenith angle of seventy-five degrees. However, if beams strike an alternating surface (e.g., S2 or S4), the redirected zenith angle is not seventy-five degrees. For example, beam B strikes S4 with a sixty degree zenith angle, redirects towards S3, and is redirected away from the reflector 1725 with a zenith angle of forty-five degrees. This can result in beam loss. The proportion of beams incident on S1/S3 verses S2/S4 can be about 50%. Thus, significant portions of beams may not be redirected at zenith angles of seventy-five degrees.

Figure 18:
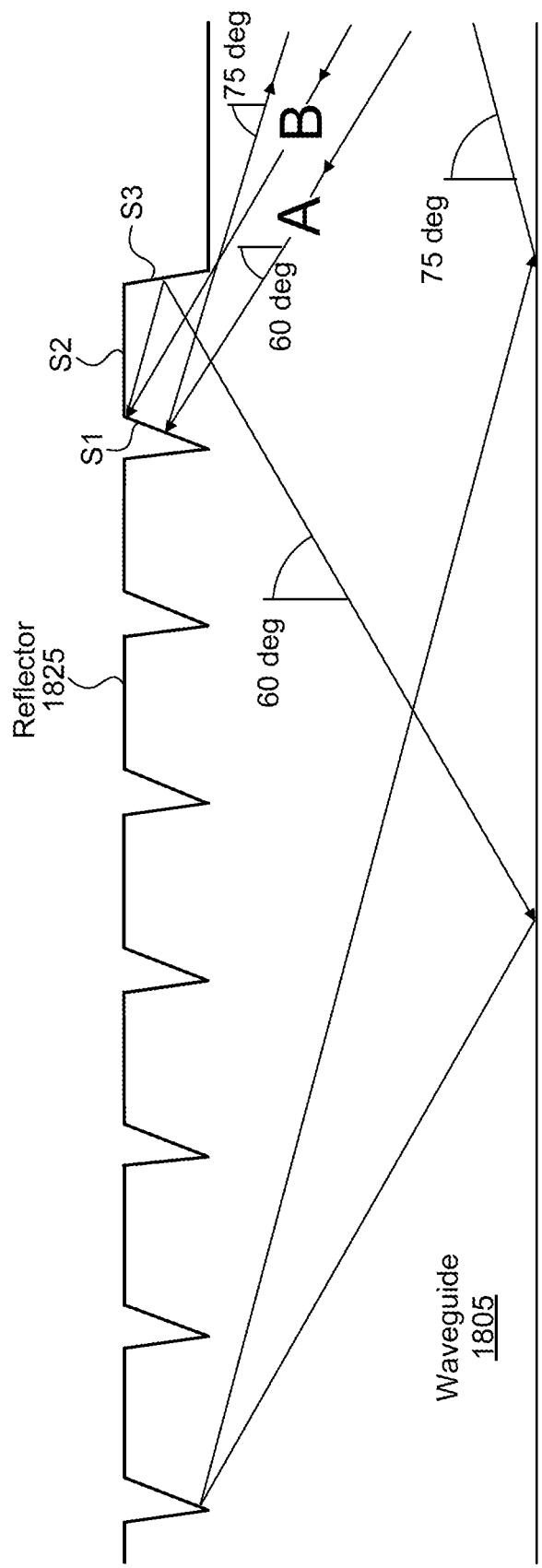

FIG. 18 illustrates a cross-sectional view of a reflector 1825, according to a fourth embodiment. Due to the arrangement of its surfaces, reflector 1825 can have a higher efficiency than reflector 1725. Similar to the design in FIG. 17, the reflector 1825 can increase the zenith angle of incident beams (e.g., from sixty to seventy-five degrees). The reflector 1825 includes a set of repeating surfaces (e.g., surfaces S1-S3) that form an array of ridge structures along the reflector 1825. Although each set of repeating surfaces in FIG. 18 are identical, each set of repeating surfaces can be different (e.g., each set is oriented to redirect optical beams at different angles). The reflector 1825 may be made of metal or the surfaces may be metalized to redirect the beams. Other suitable approaches to making the surfaces reflective may also be used. The height of the reflector 1825 can be as small as a few micrometers.

The front reflecting surface (or "first reflecting surface") of each ridge is orientated at an angle that redirects incident beams with an increased zenith angle. For example, beam A is incident on S1 with a zenith angle of sixty degrees. Upon redirection, beam A propagates away from the reflector 1825 with a zenith angle of seventy-five degrees. In some situations, instead of exiting the reflector 1825, a redirected beam will strike the opposing surface (or "second reflecting surface"). For example, beam B strikes S3 after redirecting from S1. The opposing surface is tilted such that the beam can be redirected in the original direction and with a launch angle equal or substantially equal to the original zenith angle (but with opposite sign). The resulting beam can therefore be redirected off the bottom surface of the waveguide 1805 (e.g., via TIR) and be directed towards another ridge of the reflector 1825 where it can either be returned at the increased zenith angle or again redirected further into the array of ridge structures. As a result, the reflector 1725 can have a higher efficiency than reflector 1825 due to the opposing surfaces redirecting beams back toward the waveguide with the original zenith angle (or substantially the original zenith angle).

In some embodiments, the combined thickness of the waveguide 1805 and reflector 1825 is chosen so that the overall number of reflections is reduced. However, in other embodiments the efficiency of the reflector 1825 can still be higher than alternative designs, such as the one in FIG. 17.

F. Examples of Coupler Structures

Figure 19:
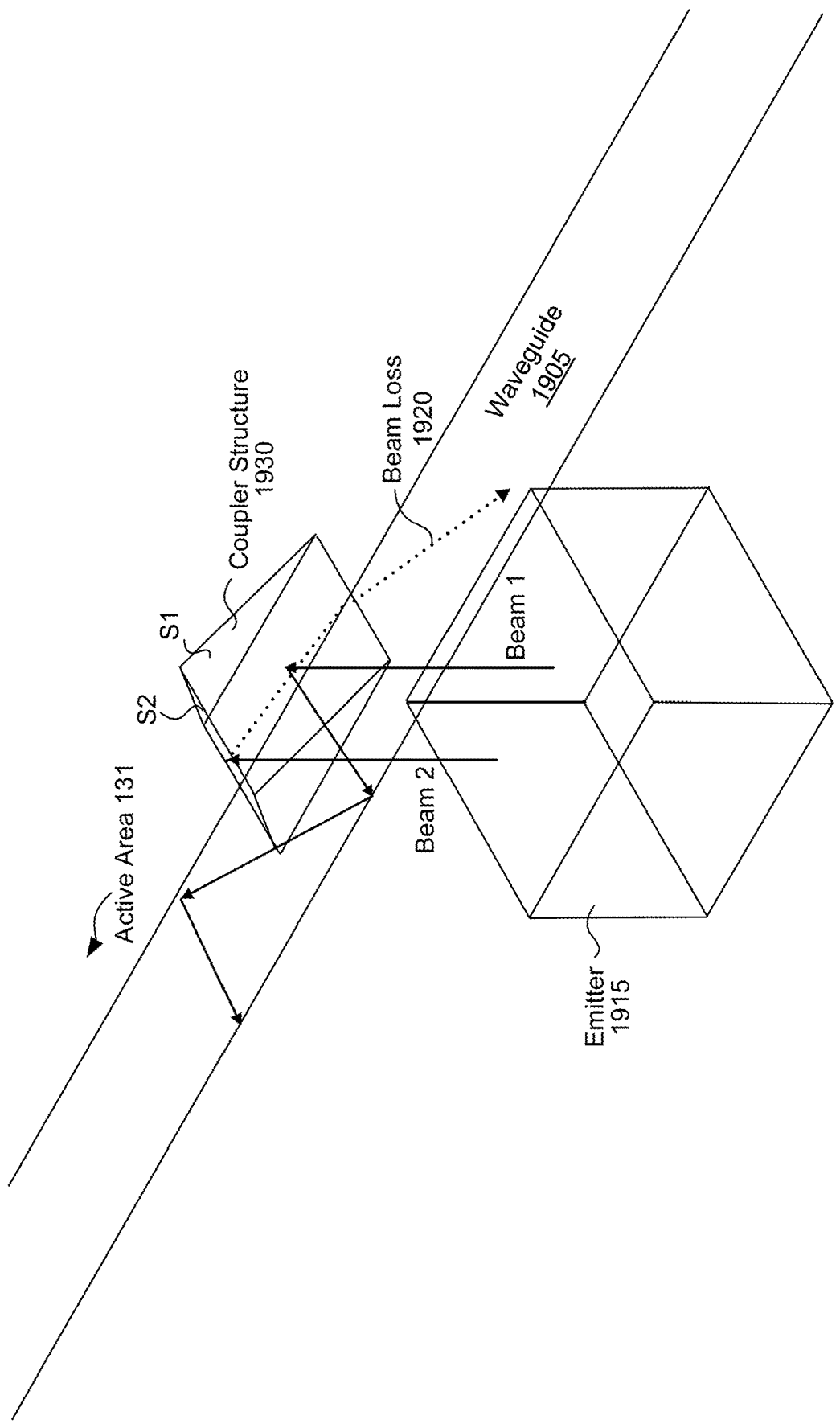
FIG. 19 illustrates a perspective view of beam paths reflected from a coupler structure, according to an embodiment.

FIG. 19 illustrates a perspective view of beam paths redirected from a coupler structure 1930, according to an embodiment. Beams are emitted from an emitter 1915, such as a VCSEL. The coupler structure 1930 is a prism and may be a part of an emitter coupler. The emitter 1915 may be a part of an emitter array. In the embodiment shown, the emitter 1915 is below the bottom surface of the waveguide 1905 and the coupler structure 1930 is above the top surface of the waveguide 1905. Optical beams propagate from the emitter 1915 towards the coupler structure 1930 and redirect off surfaces S1 and S2. Example optical beam 1 is incident on S1 of the coupler structure 1930. S1 redirects the beam such that it propagates through the waveguide 1905 via TIR towards the active area 131. S2 is formed by connecting S1 to the top surface of the waveguide. Thus, beams redirected by S2 can be redirected in an undesired direction or with an undesired elevation angle. This can result in beam loss 1920. For example, optical beam 2 is incident on S2 of the coupler structure 1930 and is redirected away from the active area 131. Beam loss 1920 can be reduced by redirecting such beams back towards the active area 131 e.g., by a reflector.

Figure 20:
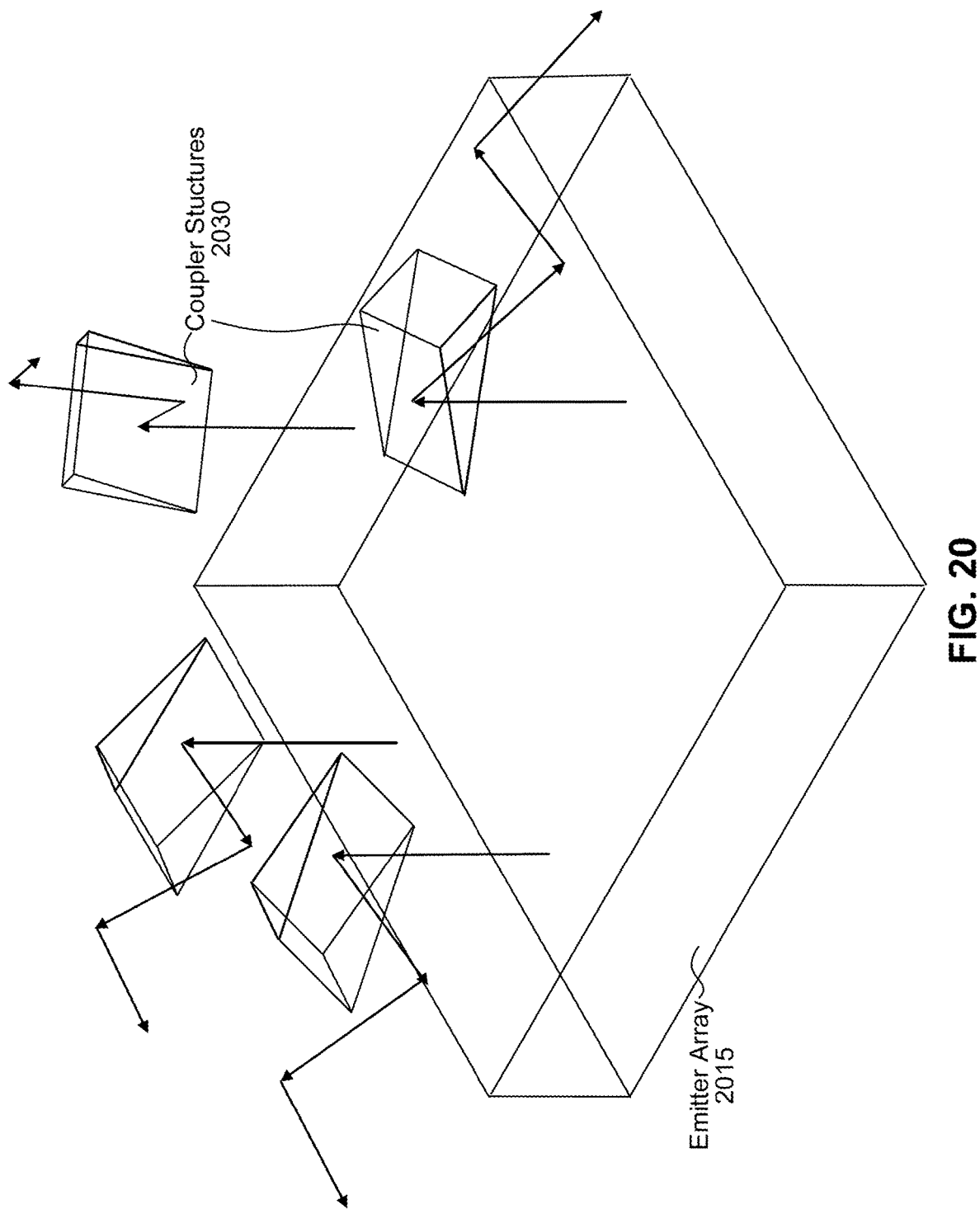
FIG. 20 is a perspective view of an emitter array and coupler structures, according to an embodiment.

FIG. 20 is a perspective view of an emitter or an emitter array 2015 and coupler structures 2030, according to an embodiment. Similar to FIG. 19, beams are emitted from an emitter array 2015, such as an array of VCSELs. The beams travel upward and are redirected by coupler structures 2030 above the top surface of a waveguide. For simplicity, the waveguide is not shown. The coupler structures 2030 can be a part of an emitter coupler. The coupler structures 2030 can be arranged such that the optical beams propagate in a predetermined pattern. For example, the coupler structures 2030 can be arranged such that the optical beams are evenly distributed throughout the waveguide. Furthermore, the coupler structures 2030 can be arranged within subgroups such that a predetermined pattern includes different reflective patterns. For example, the one or more coupler structures 2030 can have surfaces that redirect beams at a first elevation angle (e.g., thirty degrees) and other coupler structures 2030 can have surfaces that redirect beams at a second elevation angle (e.g., fifteen degrees). It should be appreciated that an arrangement of coupler structures 2030 may be selected to achieve almost any desired distribution of beams.

Note that the emitter 2015 can be either a single emitter or an emitter array. In the case of it is a single emitter, the population of coupler structures 2030 can be arranged to distribute the beams in an arbitrarily complex distribution of directions, potentially with a different effective emitter location for each direction. If the emitter 2015 is an array of emitters, then one or more of the coupler structures 2030 can be associated with each element of the array and guide the emitted beams in any desired direction or directions.

What is claimed is:

1. An optical touch-sensitive device comprising:
   an optical waveguide having an active area and a periphery;
   a set of one or more emitter couplers on the periphery of the waveguide, the set of emitter couplers including optical structures configured to distribute optical beams across the active area of the waveguide according to a predetermined pattern, wherein touches on the active area disturb optical beams, the touch-sensitive device configured to determine touch events based on the disturbances;
   a set of one or more detector couplers on the periphery of the waveguide, the set of detector couplers including optical structures configured to redirect optical beams to one or more detectors; and
   a set of one or more reflectors on the periphery, the set of reflectors including optical structures configured to receive optical beams propagating in the waveguide via total internal reflection (TIR) and to redirect optical beams to propagate in the waveguide via TIR towards the set of detector couplers, wherein at least one reflector of the set of reflectors is configured to receive optical beams propagating in the waveguide via TIR at an initial elevation angle relative to a surface of the waveguide and to redirect optical beams to propagate in the waveguide via TIR with a modified elevation angle relative to the surface.

2. The optical touch-sensitive device of claim 1, wherein a subset of the set of reflectors includes reflectors that are discrete and dithered along a side of the periphery.

3. The optical touch-sensitive device of claim 1, wherein the set of reflectors comprises a reflector that spans a length of a side of the periphery.

4. The optical touch-sensitive device of claim 1, wherein the set of emitter couplers consists of a single emitter coupler and the set of detector couplers consists of a single detector coupler.

5. The optical touch-sensitive device of claim 1, wherein the set of emitter couplers and the set of detector couplers are arranged along a same side of the periphery and the set of reflectors is arranged along remaining sides of the periphery.

6. The optical touch-sensitive device of claim 1, wherein each side of the periphery includes an emitter coupler and a reflector.

7. The optical touch-sensitive device of claim 1, wherein the predetermined pattern of optical beams is such that a touch of a predetermined size at any location on the active area disturbs at least one of the optical beams.

8. The optical touch-sensitive device of claim 1, wherein the modified elevation angle is smaller than the initial elevation angle.

9. The optical touch-sensitive device of claim 8, wherein optical beams propagating at the modified elevation angle are less sensitive to touches than optical beams propagating at the initial elevation angle.

10. The optical touch-sensitive device of claim 1, wherein the modified elevation angle is larger than the initial elevation angle.

11. The optical touch-sensitive device of claim 1, wherein at least one reflector of the set of reflectors is configured to receive optical beams propagating in the waveguide at the modified elevation angle relative to the surface and to redirect optical beams to propagate in the waveguide with the initial elevation angle relative to the surface.

12. The optical touch-sensitive device of claim 1, wherein at least one of: an emitter coupler of the set of emitter couplers, a detector coupler of the set of detector couplers, or a reflector of the set of reflectors is integrated into the waveguide.

13. The optical touch-sensitive device of claim 1, wherein at least one of: an emitter coupler of the set of emitter couplers, a detector coupler of the set of detector couplers, or a reflector of the set of reflectors is integrated into a thin film attached to the surface or another surface of the waveguide.

14. The optical touch-sensitive device of claim 13, where a thickness of the thin film is less than or equal to 500 micrometers.

15. The optical touch-sensitive device of claim 1, further comprising:
   an emitter array coupled to an emitter coupler of the set of emitter couplers and configured to produce and transmit concentrated optical beams to the emitter coupler.

16. The optical touch-sensitive device of claim 1, wherein the one or more detectors comprise a detector array configured to receive concentrated optical beams from a detector coupler of the set of detector couplers.

17. An optical touch-sensitive device comprising:
   an optical waveguide having an active area and a periphery;
   a set of one or more emitter couplers on the periphery of the waveguide, the set of emitter couplers configured to redirect optical beams from one or more emitters into the active area of the waveguide;

a set of one or more detector couplers on the periphery of the waveguide, the set of detector couplers configured to optically couple optical beams from the active area of the waveguide to one or more detectors; and a set of one or more reflectors on the periphery, the set of reflectors configured to receive optical beams propagating in the waveguide via total internal reflection (TIR) from the set of emitter couplers and to redirect optical beams to propagate in the waveguide via TIR across the active area to the set of detector couplers, wherein touches on the active area disturb optical beams, and the touch-sensitive device is configured to determine touch events based on the disturbances, wherein at least one reflector of the set of reflectors is configured to receive optical beams propagating in the waveguide via TIR at an initial elevation angle relative to a surface of the waveguide and to redirect optical beams to propagate in the waveguide via TIR with a modified elevation angle relative to the surface.

18. The optical touch-sensitive device of claim 17, wherein the set of emitter couplers and the set of detector couplers are arranged along a same side of the periphery and the set of reflectors is arranged along remaining sides of the periphery.

19. The optical touch-sensitive device of claim 17, wherein the one or more detectors comprise a detector array configured to receive concentrated optical beams from a detector coupler of the set of detector couplers, and further comprising:

an emitter array coupled to an emitter coupler of the set of emitter couplers and configured to produce and transmit concentrated optical beams to the emitter coupler.

20. The optical touch-sensitive device of claim 17, wherein:

the modified elevation angle is smaller than the initial elevation angle; and optical beams propagating at the modified elevation angle are less sensitive to touches than optical beams propagating at the initial elevation angle.

* * * * *